(12) United States Patent
Sugimoto et al.

(10) Patent No.: US 6,644,962 B2
(45) Date of Patent: Nov. 11, 2003

(54) HEATING FURNACE HAVING HEAT REGENERATING BURNERS AND OPERATION METHOD THEREOF

(75) Inventors: Ichiro Sugimoto, Kurashiki (JP); Kenta Karube, Kurashiki (JP); Masahiro Furukawa, Kurashiki (JP); Kazunari Andachi, Kurashiki (JP)

(73) Assignee: Kawasaki Steel Corporation, Kobe (JP)

( * ) Notice: Subject to any disclaimer, the term of this patent is extended or adjusted under 35 U.S.C. 154(b) by 0 days.

(21) Appl. No.: 10/220,726

(22) PCT Filed: Dec. 27, 2001

(86) PCT No.: PCT/JP01/11508

§ 371 (c)(1),
(2), (4) Date: Sep. 4, 2002

(87) PCT Pub. No.: WO02/057501

PCT Pub. Date: Jul. 25, 2002

(65) Prior Publication Data

US 2003/0027095 A1 Feb. 6, 2003

(30) Foreign Application Priority Data

| Jan. 17, 2001 | (JP) | ................................ 2001-8523 |
| Jan. 17, 2001 | (JP) | ................................ 2001-8524 |
| Jan. 23, 2001 | (JP) | ................................ 2001-14230 |
| Jan. 25, 2001 | (JP) | ................................ 2001-16974 |
| Jan. 25, 2001 | (JP) | ................................ 2001-17017 |

(51) Int. Cl.[7] ................................................ F27D 19/00
(52) U.S. Cl. ..................... 432/47; 432/128; 432/146; 432/152; 432/153

(58) Field of Search ................... 432/47, 128, 126, 432/127, 146, 121, 152, 153

(56) References Cited

U.S. PATENT DOCUMENTS

| 5,266,027 A | * 11/1993 | Kuwayama ................ 432/128 |
| 5,314,170 A | 5/1994 | Tada et al. |
| 6,290,492 B1 | * 9/2001 | Li et al. ...................... 432/14 |

FOREIGN PATENT DOCUMENTS

| JP | A 61-119987 | 6/1986 |
| JP | A 62-40312 | 2/1987 |
| JP | A 6-200329 | 7/1994 |
| JP | A 7-316645 | 12/1995 |
| JP | A 9-53120 | 2/1997 |
| JP | A 9-170749 | 6/1997 |
| JP | A 9-209032 | 8/1997 |
| JP | A 10-9558 | 1/1998 |
| JP | A 10-30812 | 2/1998 |
| JP | A 10-185177 | 7/1998 |
| JP | Y2 2589541 | 11/1998 |
| JP | B2 2885072 | 2/1999 |
| JP | A 11-172326 | 6/1999 |
| JP | A 11-248151 | 9/1999 |
| JP | A 2001-98320 | 4/2001 |

* cited by examiner

*Primary Examiner*—Jiping Lu
(74) *Attorney, Agent, or Firm*—Oliff & Berridge, PLC

(57) ABSTRACT

A method of controlling a furnace pressure for preventing air from intruding to a heating furnace, a method of stable operation during low combustion load of heat regenerating burners and a method of measuring concentration of an atmospheric gas in a heating furnace are proposed.

17 Claims, 18 Drawing Sheets

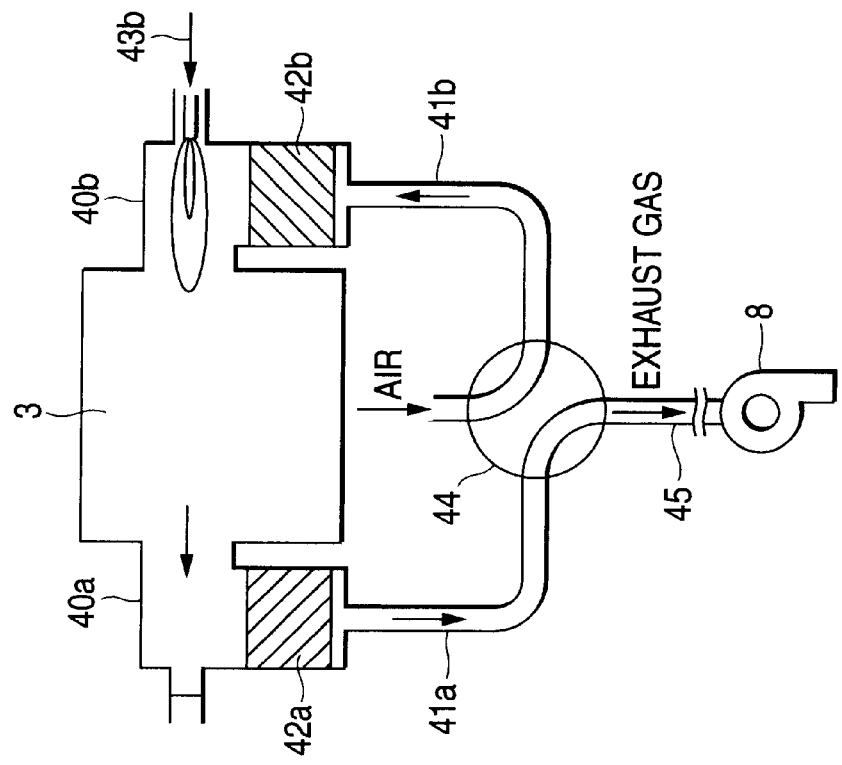
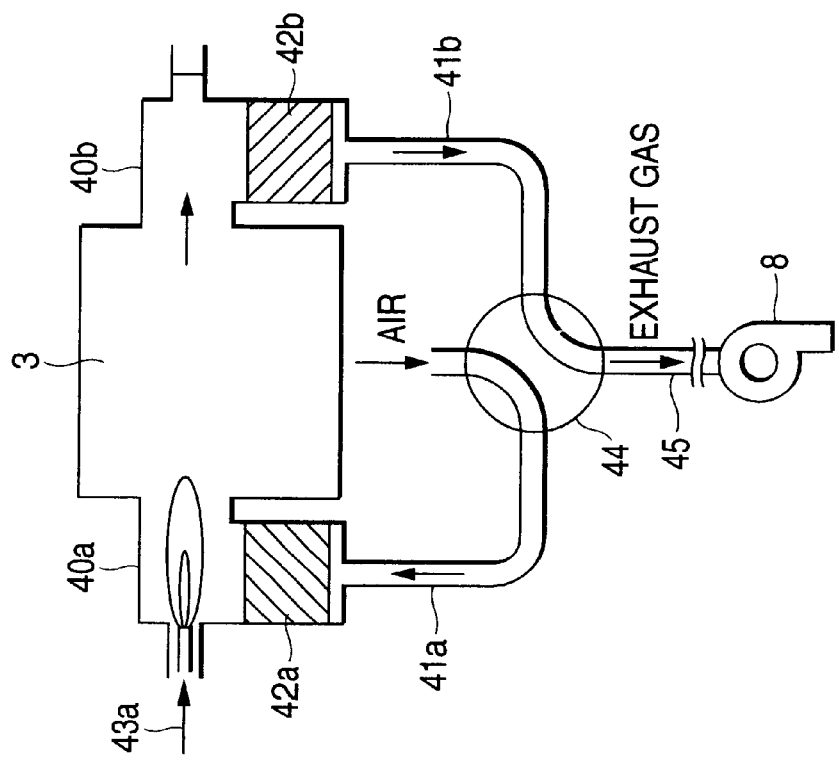

HEATING FURNACE HAVING HEAT REGENERATING BURNERS AND OPERATION METHOD THEREOF

TECHNICAL FIELD

This invention concerns a method of optimally controlling the furnace pressure of a heating furnace. This invention relates to a method of controlling the atmosphere in a heating furnace and, particularly, a method of suppressing increase of an oxygen concentration in the atmosphere. This invention relates to an operation method of a heating furnace having heat regenerating burners and a heating furnace, particularly, to an operation method for conducting alternate combustion of paired burners in heat regenerating burners advantageously and a heating furnace used directly for the operation. This invention concerns a method of measuring the concentration of an atmospheric gas in a heating furnace and a heating furnace.

BACKGROUND ART

A heating furnace for steel materials is used with an aim of re-heating steel pieces roughly rolled in a blooming factory or continuously rolling cast pieces into final products to a predetermined temperature suitable to rolling. The heating furnace is generally classified into a batch type and continuous type. Since they have respective advantages and drawbacks, they are used selectively depending on the purposes. Since the continuous heating furnace is suitable to mass production in recent years, they have been often been used, for example, in iron making plants.

FIG. 1 shows a typical example of a cross sectional view for a continuous heating furnace. It generally comprises a preheating zone 1, a heating zone 2 and a soaking zone 3 successively from the side of charging steel materials. At least the heating zone 2 and the soaking zone 3 are heated to and kept at a predetermined temperature by burners 4. Steel material 5 introduced from a charging door 1a into the preheating zone 1 are moved on a transportation path 6 and heated to a predetermined temperature by way of the heating zone 2 and the soaking zone 3 and then delivered to the outside of the furnace from an extraction door 3a on the exit side of the soaking zone 3. Exhaust gases formed by combustion of the burners 4 are discharged from a stack 7 disposed on the entrance of the preheating zone 1 to the outside of the furnace. 7a denotes a recuperator for heat exchange of the sensible heat of an exhaust gas in the stack 7 to the sensible heat of a burner combustion gas and 7b denotes a damper for furnace pressure control. Then, in the continuous heating furnace, it is necessary to heat the steel materials to a temperature suitable to a subsequent rolling step. When the temperature of the steel materials heated in the continuous heating furnace is lower than the lower limit of a predetermined temperature suitable to rolling, it results in undesired effects on the rolling operation and product quality. On the other hand, when the temperature of the steel materials extracted from the heating furnace is unnecessarily higher, heat loss increases in the continuous steel material heating furnace. Therefore, it is important in the continuous heating furnace to heat the steel materials up to the temperature suitable to rolling with necessary minimum of fuels. Further, in the heating furnace, it is also required to control the heating time such that heated steel materials are supplied successively from the heating furnace corresponding to the rolling pitch in the rolling step.

In the continuous heating furnace, heat loss, particularly, radiation energy loss from the heating zone is large. The heat loss is suppressed by providing a preheating zone and a soaking zone at the inlet and the exit of the heating zone to partition the inside of the furnace into three parts.

Steel materials to be charged in the continuous heating furnace includes, for example, cast pieces cooled to a normal temperature and hot charged materials sent directly after continuous casting to the rolling step, and the temperature on the inlet of the heating furnace is various. The heating temperature is varied and the processing amount of steel materials to be heated in the heating furnace also varies. The temperature in the heating furnace has to be controlled in according with such various conditions. The heating temperature is adjusted by increasing or decreasing the combustion amount of burners. The pressure in the furnace fluctuates in this case depending on the change of the combustion amount of the burners.

When the pressure in the furnace is lowered compared with the pressure outside the furnace, external air intrudes into the furnace through the charging door and the extraction door as openings of the heating furnace. When air intrudes into the furnace, since the temperature in the furnace lowers, the combustion amount of the burners is increased. This increases the fuel consumption ratio to increase the cost. When air intrudes into the furnace, since concentration of oxygen in the furnace atmosphere increases, oxidation, nitridation or decarbonization on the surface of steel materials charged in the furnace are promoted. As a result, it results in deteriorates the surface quality of the steel materials.

Accordingly, it is necessary to properly control the pressure in the heating furnace. Various proposals have been made for the control of the furnace pressure. For example, JP-A-61-119987 discloses prevention of air intrusion from a charging door and an extraction door by controlling the furnace pressure set in the soaking zone of a heating furnace to a positive pressure relative to the pressure outside of the furnace (hereinafter simply referred to as positive pressure) in accordance with the amount of exhaust gases generated in the furnace. According to this method, it is possible to control the furnace pressure in an upper region of the furnace with the transportation path as a boundary (hereinafter referred to as an upper zone) to a positive pressure. However, when the combustion load on the entire heating furnace is small, the furnace pressure in the lower region of the furnace with the transportation path as the boundary (hereinafter referred to as a lower zone) becomes negative relative to the pressure outside the furnace (hereinafter referred to as a negative pressure). It has been difficult to reliably prevent intrusion of air through gaps below the charging door and the extraction door. It has been difficult to reliably prevent intrusion of air through so-called extra fork openings in which the doors are closed while being engaged to each other in a comb teeth shape. Comb-shaped extract fork opening is shown at 3C in FIG. 14.

Further, JP-A-9-209032 discloses optimum control for a furnace pressure in accordance with the amount of combustion load on a heating furnace by a furnace pressure damper disposed in a stack through which exhaust gases from the heating furnace are passed in the upper region of the soaking zone. However, when the amount combustion load is small, draft in the stack increases compared with the pressure loss due to the flow of exhaust gases from the inside of the furnace to the stack. The draft means that gases heated in the stack or in the furnace cause buoyancy to form a negative pressure. In this case, it is difficult to form a positive pressure as far as the lower zone by the furnace pressure damper. It has been difficult to reliably prevent intrusion of air from the charging door and the extraction door.

JP-A-7-316645 discloses a method of connecting a gas supply pipeline system to a stack on the exit of a recuperator and blowing a gas such as air into the stack thereby controlling the furnace pressure. This method requires to additionally provide a blower, various pipelines and a control system for controlling the furnace pressure. It involves a problem in that the installation cost is high and the maintenance is troublesome. In addition, since ducts or accessory equipments are incorporated in a complicate manner at the periphery of the heating furnace, there is no room for installation space and additional prevision of the control system is difficult.

Prevention of air intrusion into the heating furnace is extremely important in view of the product quality and in view of the operation of the heating furnace. Various techniques have been proposed. For example, JP-A-11-172326 proposes to jet out a combustible gas from a nozzle disposed near an extraction port separately from heating burners in a furnace and consume oxygen in intruding air upon combustion.

However, it requires provision of an exclusive combustion gas jetting nozzle near the extraction port to increase an installation cost. Further, while this is effective for intrusion air from a portion above the position where the jetting nozzle is disposed but the effect is insufficient for intrusion air from a portion below the position where the jetting nozzle is disposed. Since the furnace pressure is negative in the lower portion, intrusion of air to the portion is inevitable. Among all, it has been difficult to reliably prevent intrusion of air through the extraction fork opening.

In recent years, in a continuous heating furnace, operation for a heating furnace with less heat loss has been conducted by using heat regenerating burners as the heat source and re-utilizing heat in exhaust gases for preheating of burner combustion air. FIG. 2A and FIG. 2B show an example for the structure of a heat regenerating burner. As shown in the Example of FIG. 2A and FIG. 2B, a heat regenerating burner comprises a pair of burners 40*a* and 40*b* opposed to each other between both side walls of a heating furnace soaking body 3, both-way channels 41*a* and 41*b* used for introducing combustion air from the outside of the furnace to each of the burners and for introducing exhaust gases from the inside of the furnace by way of each burner to the outside of the furnace, and heat regeneration bodies 42*a* and 42*b* disposed to the openings in each of the channels on the side of the burners in the illustrated example. In the heat regenerating burner, the paired burners are alternately put to combustion. For example, as shown in FIG. 2A, when combustion air is supplied to the burner 40*a* from the both-way channel 41*a* and fuel 43*a* is supplied to burn the burner 40*a*, an exhaust gas in the furnace is sucked from the burner 41 opposed thereto, the exhaust gas is passed through the heat regeneration body 42*b* to recover the heat and then introduced to the both-way channel 41*b* and discharged out of the furnace.

Then, the burner combustion operation is switched and, when a switching valve 44 for the both-way channels 41*a* and 41*b* is switched to change the connection with conduits for air and exhaust gas described above and then, as shown in FIG. 2B, a combustion air is supplied to the burner 40*b* from the both-way channel 41*b* by way of the heat regeneration body 42*b*, it is supplied while pre-heating the combustion air by utilizing the heat recovered in the heat regeneration body 42*b* in the step previously shown in FIG. 2A and, simultaneously, fuel 43*b* is supplied to burn the burner 40*b*. At the same time, an exhaust gas in the furnace is sucked from the burner 40*a* opposed thereto and the exhaust gas is passed through the heat regeneration body 42*a* to recover the heat and then introduced to the both-way channel 41*a* and discharged out of the furnace.

Operation for the heating furnace with less heat loss can be conducted by repeating the alternate combustion of the burners shown in FIG. 2A and FIG. 2B described above, for example, on every several tens seconds.

In this case, for the suction of the exhaust gas from the burner in a not combustion state, a suction device 8, for example, a suction blower is disposed to the end of a path 45 for sucking by way of the heat regeneration body 42*b* or 42*b* from the burner 40*a* or 40*b*, for example, as shown in FIGS. 2A and 2B, and the exhaust gas from the burners is sucked by driving the suction device 8.

By the way, in the operation of the heating furnace using the heat regenerating burners described above, during the period from the start of the burner combustion till the set temperature, or in a case of controlling the atmosphere in the furnace to a lower temperature region such as at about 800° C., the temperature of the exhaust gas sucked from the burner and passed through the regeneration body also lowers. As a result, moistures or sulfur contents contained in the exhaust gas are condensed at the exit of the exhaust gas of the regeneration body or in the path 45 succeeding thereto. Liquids caused by condensation, so called drains may sometimes stagnate at the exit of the exhaust gas of the regeneration body. When the burner combustion operation is switched as it is into a combustion state, since drains are mixed with the combustion air, this results in a problem of lowering the temperature of the combustion flame. Lowering of the temperature for the combustion flame by the drains lowers the heat efficiency of the heating furnace and may sometimes bring about a trouble in the low temperature operation.

Further, in a heating furnace where plural heat regenerating burners are disposed, the path introducing the exhaust gas rendered to a low temperature from the burner through the heat regeneration body to the suction device is long. Drains are formed not only at the exit of the heat regeneration body but also in the course of the path. Then, drains formed on the path cause corrosion to the impeller of the suction device. When solid components contained in the drains damage the impeller by abrasion, it may cause a worry of developing to fatal accidents. Accordingly, in the heating furnace having the heat regenerating burners, the suction device for the exhaust gas has been checked frequently. Further, it has also brought about a problem for the increase of the cost requiring for frequent maintenance such as exchange of the impeller of the suction device.

In view of the problems regarding the drains described above, JP-A-10-30812 discloses a device shown in FIG. 3. An exhaust gas in a heating furnace (for example, in soaking zone 3) is flowed through a bypass pipe 51 to an exhaust gas pipeline channel 50 separately from a channel of discharge through a burner 40*a* and an exhaust gas pipeline channel 50 to the outside of the furnace. It is disclosed that the temperature of the exhaust gas pipeline channel 50 is kept above a dew point of the exhaust gas with this constitution.

However, in a case of heating at a relatively low temperature for a long time in order to make the temperature uniform along the direction of the thickness of the steel material or in a case where installation troubles occur and high load combustion is impossible, it is necessary to burn the burners at an extremely low load. In this case, since the suction device (blower) is operated while reducing the suction power thereof to less than about 10% thereof, operation of the suction device sometimes becomes unstable. Swirling stream can not be obtained stably on the entire surface to result in a portion where swirling stream can not be obtained by stalling. Then, this not only brings about a difficulty in keeping the suction amount of the exhaust gas from the burner constant but also results in generation of abnormal vibrations to the blade to possibly damage the blower depending on the case.

As has been described above, while the technique described in JP-A-10-30812 can solve various problems regarding the drains in a case of combustion at low load, it can not still solve the problem that the operation of the suction device becomes unstable. Further, since control valves are present respectively to the exhaust gas 50 and the bypath pipeline 51 described in the publication, this also results in a problem that the control therefor is complicated.

For keeping the surface of the steel materials during heating satisfactory, it is important to strictly control the atmosphere in the furnace of the continuous heating furnace. For example, when the oxygen concentration in the furnace atmosphere increases, surface oxidation, nitridation or carburization of materials to be heated such as steel materials charged in the furnace are promoted and, when they are rolled as they are, the surface quality of the products is deteriorated. For improving or keeping the product quality, it is necessary to suppress increase for the oxygen concentration in the furnace atmosphere. For this purpose, it is important to exactly measure the oxygen concentration in the furnace atmosphere.

In addition to the oxygen concentration, it is also important to exactly measure the temperature for nitrogen, carbon monoxide or oxynitrides in the furnace atmosphere. Nitrogen gives an effect on nitridation on the surface of the steel materials, carbon monoxide can be utilized for the detection of incomplete combustion of burners and oxynitrides are necessary for the administration of environmental discharge standard values.

Then, JP-A-62-40312 discloses that each of the probes for measuring the oxygen concentration and the Co concentration in the heating furnace is made moveable, concentration is measured at plural measuring positions and an average concentration value is determined to amend and control the air ratio in the burners.

However, since it is necessary to additionally dispose a driving system or control system for measuring the density, the installation cost is high. Further, there is also a problem that the maintenance is complicate and since ducts or auxiliary equipments are incorporated complicatedly in the heating furnace, there is no room for disposition and it was often difficult to additionally dispose a driving system or control system.

Further, JP-A-9-53120 discloses a heating furnace in which a partition wall is located inside of the furnace wall of the heating furnace on the extraction side and below the skid along the lateral direction of the furnace, and an oxygen densitometer and an exhaust pipe for discharging the atmospheric gas to the outside of the furnace are disposed between the partition wall and the furnace wall on the extraction side. It is disclosed that flow rate in the exhaust pipe is controlled while measuring the oxygen density by using the oxygen densitometer in the heating furnace.

However, for conducting measurement by the oxygen densitometer between the partition wall and the furnace wall on the extraction side, a probe has to be inserted from the hearth or furnace wall. When the probe is inserted from the hearth, since probe is damaged or clogged due to dropping and deposition of scales, it is difficult to measure the density at high reliability for a long period of time. Further, when the probe is inserted from the furnace wall, since the probe is exposed to high temperature region in the furnace and distorted, it may cause a worry that the measuring point is displaced or the probe is damaged.

DISCLOSURE OF THE INVENTION

One of the objects of this invention is to provide a method of controlling a furnace pressure capable of reliably preventing air from intruding into a heating furnace.

The present inventors have made an earnest study on the intrusion of air in a case where the pressure in the furnace becomes negative. Air intrudes from both of the charging door and the extraction door into the furnace. As shown in FIG. 1, a stack 7 is disposed just after the charging door 1a. Air intruding from the charging door 1a directly passes to the stack 7 and discharged out of the furnace. It has been found that air intruding through the charging door 1a less causes a factor of bringing about increase of the oxygen density in the furnace or lowering the temperature in the furnace. It is important to avoid the intrusion of the air from the extraction door in order to avoid increase of the oxygen concentration in the furnace or lowering of the temperature in the furnace. For this purpose, it has been found that it is important to properly control the furnace pressure in the soaking zone to which the extraction door is disposed.

As described above, it is difficult to maintain the pressure of the furnace positive in a lower region below the transportation path of the soaking zone upon control of the furnace pressure by on/off of the damper disposed in the stack, particularly, in a case where the combustion load is small. This is because the amount of the exhaust gas generated is decreased and the pressure loss of the exhaust gas from the inside of the furnace to the passage through the stack is decreased, whereas the draft increases more to the downstream in the furnace. The distribution of the furnace pressure lowers gradually toward the downstream of the heating furnace relatively. In the downstream region, draft increases compared with the pressure loss of the exhaust gas tending to cause a negative pressure.

By the way, operation of a heating furnace with less heat loss is adopted by using heat regenerating burners as a heat source of a continuous heating furnace and re-utilizing the heat in the exhaust gas for preheating combustion air of burners. It has been studied on the furnace pressure control in a heating furnace using the heat regenerating burners. It has been found that a strict furnace pressure control is possible, particularly, in a case of using heat regenerating burners as a heat source in the lower region of the soaking zone, by utilizing the mechanism characteristic to the heat regenerating burner and this invention has thus been completed.

That is, this invention provide a method of controlling a furnace pressure in a heating furnace using heat regenerating burners, in which a suction ratio of an exhaust gas from the burner to a heat regenerating body is adjusted in accordance with the combustion load on the entire heating furnace, thereby controlling the furnace pressure in a soaking zone.

Further, when the present inventors have made an earnest study on a method capable of maintaining the furnace pressure positive in a lower region of the transpiration path in a soaking zone even in a case where the combustion load is small, it has been found that dilution air supplied to the inlet of a recuperator disposed to a stack can be utilized for the control of the furnace pressure with an aim of protecting the recuperator disposed in the stack.

That is, this invention provides a method of controlling a pressure in a heating furnace of disposing a recuperator in the midway of a stack for introducing an exhaust gas in the heating furnace to the outside of the furnace, preheating combustion air supplied to burners as a heat source of the heating furnace by the recuperator, and supplying dilution air to the stack at an inlet of the recuperator for protecting the recuperator against high temperature atmosphere, characterized by controlling the flow rate of the dilution air in accordance with the temperature of the exhaust gas on the inlet of the recuperator and the combustion load of the heating furnace, thereby controlling the furnace pressure.

An object of this invention is to provide a method capable of reliably preventing intrusion of air from an extraction door into a heating furnace. Further, an object of this invention is to provide a heating furnace used for the method.

When the present inventors have made an earnest study on the intrusion of air in a case where the pressure in the furnace becomes negative, it has been found that although air intrudes into the furnace from both of the charging door and the extraction door, since the stack 7 is disposed just after the charging door 1a as shown in FIG. 1, air intruding through the charging door 1a is directly passed to the stack 7 and discharged out of the furnace, it less causes a factor of increasing the oxygen temperature in the furnace or lowering of the temperature in the furnace. Accordingly, it has been found that it is important to avoid intrusion of air from the extraction port in order to avoid increase of the concentration of the oxygen in the furnace or lowering of the temperature in the furnace and, for this purpose, it is important to reliably shut intruding air at the extraction end.

An object of this invention is to provide an operation method for a heating furnace of not making the operation of an exhaust suction device unstable even in a case where combustion load on heat regenerating burners is small. Further an object of this invention is to provide a heating furnace used for the operation method for the heating furnace.

When the present inventors have made an earnest study on a method of increasing the operation load of a suction device in a case where the combustion load of the heat regenerating burners is decreased and the suction device of the exhaust gas is obliged to be operated at a load of less than 10%, it has been found that it is extremely advantageous to introduce an exhaust gas from the stack that introduces the exhaust gas of the heating furnace to the outsides of the furnace into the suction device to accomplish this invention. An object of this invention is to provide a method capable of exactly measuring the concentration of ingredient gas of the atmosphere in the heating furnace by utilizing an existent facility. A further object of this invention is to provide a heating furnace capable of measuring concentration of ingredient gas of the atmosphere in the heating furnace.

In the operation for the heating furnace using the heat regenerating burners, an operation for heating furnace with less heat loss can be realized by conducting heating repeating the steps shown in FIG. 2A and FIG. 2B, for example, on every several tens seconds.

In the operation for the heating furnace using the heat regenerating burners described above, since suction for the exhaust gas from the heat regenerating burners is conducted at a high speed, the exhaust gases distributed in the lateral direction of furnace are sucked for a wide range. Taking notice on phenomenon, the present inventors have found that the ingredient concentration of the furnace atmosphere can be measured exactly by measuring the ingredient concentration for the exhaust gas sucked from the heat regenerating burner since the exhaust gas in the furnace sucked from the heat regenerating burner favorably reproduces the furnace atmosphere, to accomplish this invention.

The gist of this invention is as described below.

1. A method of controlling a furnace pressure by utilizing heat regenerating burners in a heating furnace having a preheating zone, a heating zone and a soaking zone, in which plural sets of heat regenerating burners each having a pair of burners each having a heat regeneration body and opposed to each other are disposed as a heat source for the soaking zone, wherein the method comprises alternately burning the burners of each pairs of the heat regenerating burners, sucking an exhaust gas in the furnace from the burners during not combustion state, introducing the exhaust gas to the heat regeneration body thereby recovering the heat in the exhaust gas to the heat regeneration body, and utilizing the recovered heat for the heating of combustion air of the burners upon combustion state, thereby conducting operation for the heating furnace, wherein the suction ratio of the exhaust gas from the burner to the heat regeneration body is controlled in accordance with the combustion load on the entire heating furnace to control the furnace pressure in the soaking zone.

2. A method of controlling a furnace pressure in a heating furnace in which a recuperator is located in the midway of a stack for introducing an exhaust gas in the heating furnace to the outside of the furnace and combustion air supplied to burners as a heat source for the heating furnace is preheated by the recuperator, and dilution air is supplied to stack at an inlet of the recuperator for protecting the recuperator against high temperature atmosphere, wherein the flow rate of the dilution air is controlled in accordance with the temperature of the exhaust gas on the inlet of the recuperator and combustion load on the heating furnace, thereby controlling the furnace pressure.

3. A method of controlling an atmosphere in a heating furnace, comprising independently controlling combustion of heating burners located in a lower region of a furnace extraction end among plural heating burners located in the heating furnace upon opening the extraction door of heating furnace, extending the flame of the burners for the width of the opening in the lateral direction of extraction port, and shutting the intruding path of air from the extraction port with the burner flame, thereby suppressing increase of the oxygen concentration in the furnace.

4. A method of controlling an atmosphere in the heating furnace as defined in 3, wherein a partition wall standing vertically from the hearth is disposed to the heating burner located at the extraction end of the furnace on the inner side of the furnace thereby forming an ascending stream along with the partition wall, and carrying air intruding from the extraction port on the ascending stream.

5. A method of controlling an atmosphere in the heating furnace as defined in 3 or 4, wherein combustion operation is conducted under a low air ratio of the heating burners disposed at the extraction end of the furnace.

6. An operation method for a heating furnace having a heat regenerating burner in which a pair of burners each attached with a heat regeneration body and opposed to each other are disposed as a heat source, the method comprising alternately burning each pair of burners in the heat regenerating burner, sucking an exhaust gas in the furnace from the burners during not combustion state, introducing the exhaust gas to the heat regeneration body thereby recovering heat in the exhaust gas to the heat regeneration body, and utilizing the recovered heat for heating the combustion air of the burners during combustion state, thereby conducting operation for the heating furnace, wherein a hot blow is supplied to a suction device for sucking the exhaust gas in the furnace from the burner in the not-combustion state through the heat regeneration body in a case where the combustion load on the heat regenerating burner is small.

7. An operation method for a heating furnace as defined in 6, wherein the hot blow is the exhaust gas in the stack for introducing the exhaust gas in the heating furnace to the outside of the furnace.

8. A method of measuring the concentration of an atmosphere gas in a heating furnace comprising heat regenerating burners in which a pair of burners each attached with a heat regeneration body are opposed to each other as a heat source, by alternately burning each pair of burners of the heat regenerating burner, sucking an exhaust gas in the furnace from the burners during not-combustion state, introducing the exhaust gas to the heat regeneration body thereby recovering the heat in the exhaust gas to the heat regeneration body, and utilizing the recovered heat for heating the combustion air of the burners during combustion state, thereby conducting operation for the heating furnace wherein a portion of the exhaust gas sucked from the burners is introduced into an analyzer and measuring the concentration of ingredients in the exhaust gas.

9. A method of measuring the concentration of the atmosphere gas in the heating furnace as defined in 8, wherein the measured value for the ingredient concentration of the exhaust gas sucked from the heat regenerating burners is used as a typical value for the ingredient concentrations in the zone of the heating furnace in which the heat regenerating burners are disposed.

10. A heating furnace having plural heat regenerating burners in which a pair of burners each attached with a heat regeneration body are opposed to each other as a heat source, and adapted for alternately burning each pair of burners in the heat regenerating burners, sucking an exhaust gas in the furnace from the burners during not combustion state, introducing the exhaust gas to the heat regeneration body thereby recovering heat in the exhaust gas to the heat regeneration body, utilizing the recovered heat for heating the combustion air of the burners during combustion state thereby conducting operation, wherein at least the heat regenerating burners located in the lower region at the extraction end of the heating furnace have a combustion control system independent of other heat regenerating burners.

11. A heating furnace as defined in 10, wherein a partition wall standing from the hearth is located at a position for putting the heat regenerating burner having an independent combustion control system relative to the extraction door of the heating furnace.

12. A heating furnace having heat regenerating burners in which a pair of burners each attached with a heat regeneration body are opposed to each other as a heat source, and adapted for alternately burning each pair of burners in the heat regenerating burners, sucking an exhaust gas in the furnace from the burners during not combustion state, introducing the exhaust gas to the heat regeneration body thereby recovering heat in the exhaust gas to the heat regeneration body, utilizing the recovered heat for heating the combustion air of the burners during combustion state thereby conducting operation, a suction device is disposed at the end of the path for sucking the exhaust gas in the heating furnace from the burners during not-combustion state by way of the heat regeneration body, and a pipeline channel is disposed to the sucking path on the inlet side of the sucking device for introducing a hot blow by way of an ON/OFF valve to the suction device.

13. A heating furnace as defined in 12, wherein the pipeline channel is connected with a stack for introducing the exhaust gas in the heating furnace to the outside of the furnace and introducing the exhaust gas in the heating furnace as a hot blow.

14. A heating furnace as defined in 12 or 13, wherein a recuperator is disposed to the upstream of the pipeline channel in the stack.

15. A heating furnace having plural heat regenerating burners in which a pair of burners each attached with a heat regeneration body are opposed to each other as a heat source, and adapted for alternately burning each pair of burners in the heat regenerating burners, sucking an exhaust gas in the furnace from the burners during not combustion state, introducing the exhaust gas to the heat regeneration body thereby recovering heat in the exhaust gas to the heat regeneration body and utilizing the recovered heat for heating the combustion air of the burners during combustion state thereby conducting operation, wherein a probe for sampling a portion of the exhaust gas and an analyzer for measuring the concentration of ingredients of the sampled exhaust gas are disposed in the midway of the path for discharging the exhaust gas in the heating furnace from the burner during not-combustion state by way of the heat regeneration body.

BRIEF DESCRIPTION OF THE DRAWINGS

FIG. 2A is a view showing a structure of a heat regenerating burner.

FIG. 2B is a view showing a structure of a heat regenerating burner.

BEST MODE FOR PRACTICING THE INVENTION

The method of this invention is to be described specifically with reference to the drawings.

Figure 5:
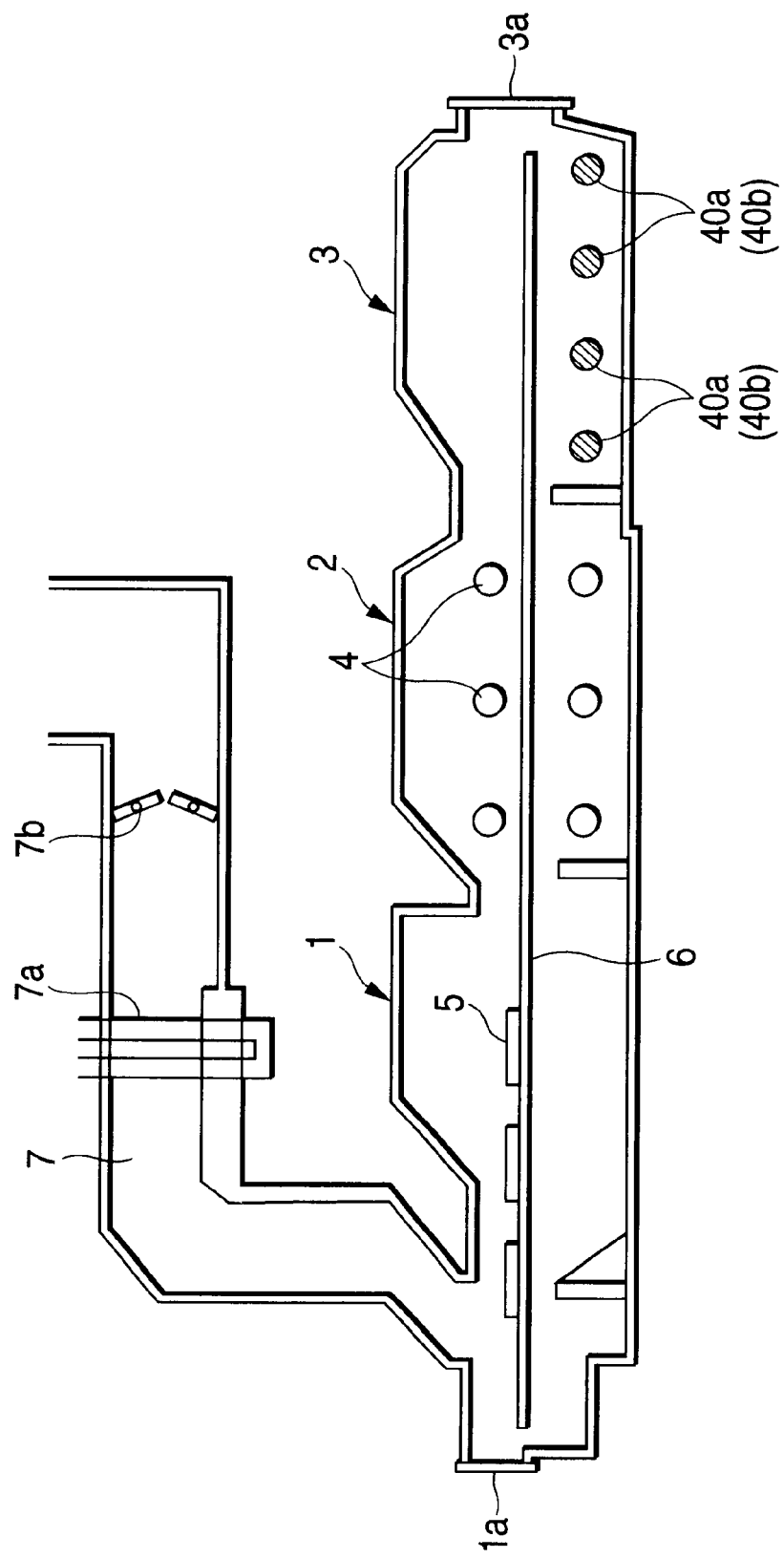
FIG. 5 is a view showing a structure of a continuous heating furnace used in this invention.

FIG. 5 shows a continuous heating furnace used directly for the method according to this invention. The heating furnace is basically identical with that shown in FIG. 1, and this is an example in which heat regenerating burners 40a and 40b shown in FIGS. 2A and 2B are disposed by plural sets at least to a lower region of a transpiration path 5 of a soaking zone 3. In FIG. 5, references 40a and 40b denote inclusively both-way parts and heat regeneration body.

In the operation of the heating furnace, a suction ratio of an exhaust gas from the burners 40a and 40b to the heat regeneration bodies 42a and 42b are adjusted in accordance with a combustion load for the entire heating furnace to control the furnace pressure. Specifically, it has a feature in controlling the furnace pressure in a lower region at a positive pressure.

That is, in the operation of the heating furnace, a furnace pressure is actually measured by a furnace pressure gage disposed in a lower region of a soaking zone, and the flow rate of the exhaust gas passing through the heat regeneration body of the heat regenerating burner is adjusted by using a flow rate control valve to control the suction ratio of the exhaust gas in accordance with an aimed furnace pressure, thereby controlling the furnace pressure in a lower region, particularly, in a lower region of the soaking zone to the aimed furnace pressure.

Figure 6:
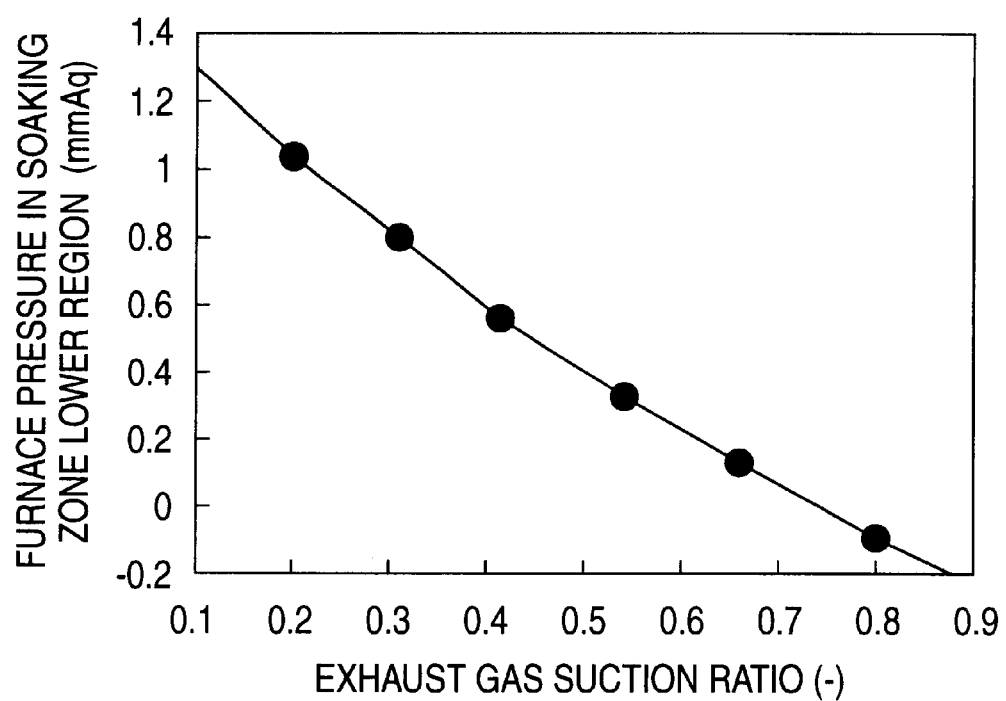
FIG. 6 is a view showing a relation between a suction ratio of an exhaust gas and a furnace pressure.

FIG. 6 shows a relation between an exhaust gas suction ratio and a surface pressure. It shows a relation between the furnace pressure in the lower region of the soaking zone and the exhaust gas suction ratio when the exhaust gas suction ratio is adjusted in accordance with the combustion load by the method described above. The exhaust gas suction ratio and the furnace pressure are in a substantially reversed proportion to each other. By adjusting the exhaust gas suction ratio, the furnace pressure can be controlled precisely. The exhaust gas suction ratio is a ratio of the amount of an exhaust gas sucked to the heat regenerating burners relative to the amount of an exhaust gas generated during combustion of the heat regenerating burners. This is determined by actually measuring the flow rate of the exhaust gas by using an exhaust gas flow meter disposed in an exhaust gas dust of heat regeneration burners.

Further, the furnace pressure is preferably controlled within a range from 0 to 0.5 mmAq in the lower region of the soaking zone by the adjustment of the exhaust gas suction ratio. When the furnace pressure in the lower region of the soaking zone is set to 0.5 mmAq or higher, the furnace pressure in the upper region of the soaking zone is excessively high and the gas in the furnace is blown out of the furnace to possibly damage the extraction door. The fuel consumption is also worsened.

Figure 8:
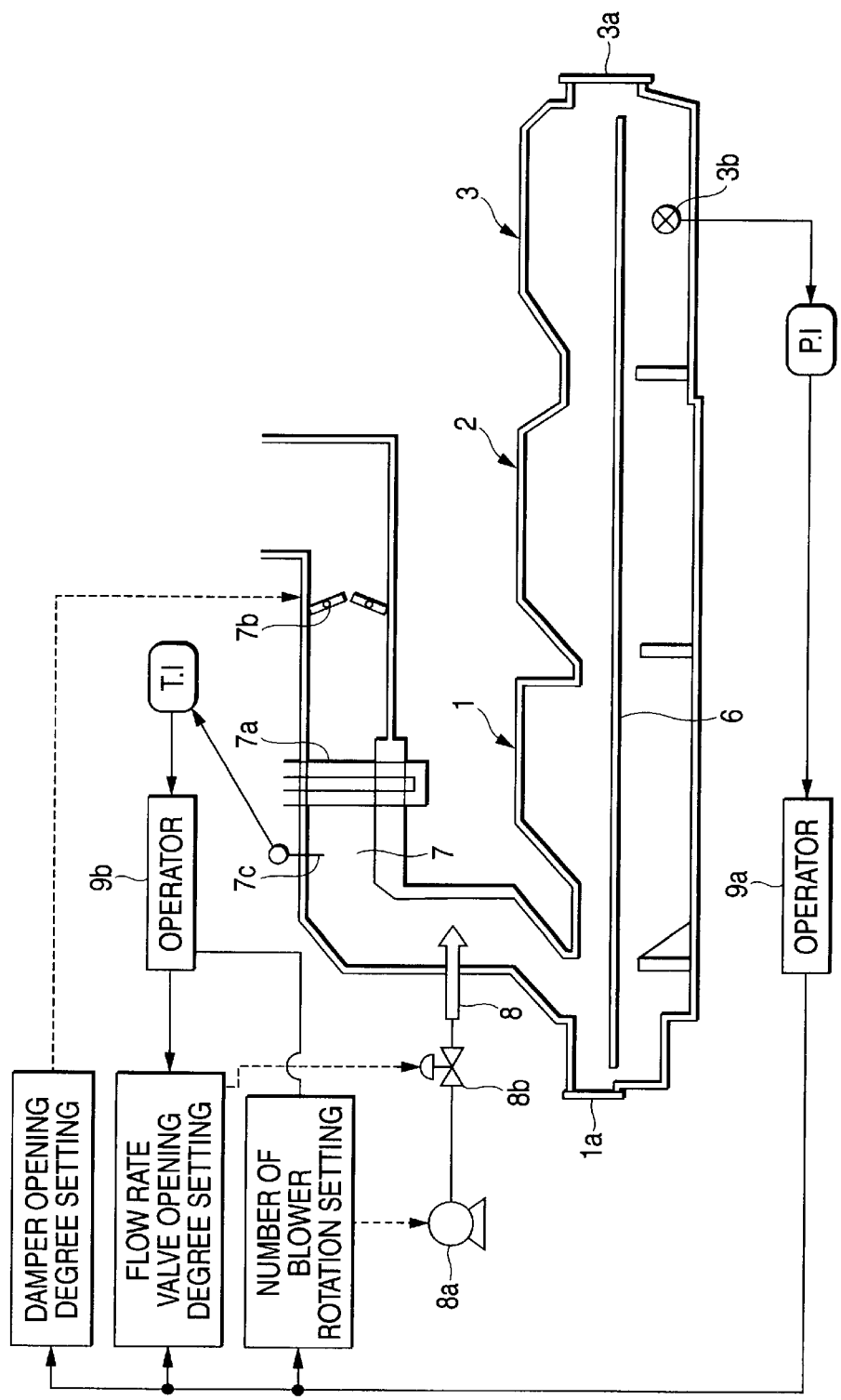
FIG. 8 is a view showing a structure of a continuous heating furnace used in this invention.

FIG. 8 shows a continuous heating furnace used directly used according to this invention. The heating furnace has a constitution basically identical with that shown in FIG. 1. It has a structure of protecting a recuperator 7a by supplying dilution air 8 to the inlet of a recuperator 7a of a stack 7 in a case where the exhaust gas in the furnace introduced to a recuperator 7a exceeds the upper limit for the heat resistant temperature of the recuperator 7a.

In the operation of the heating furnace having the structure described above, dilution air 8 is supplied also in a case where the furnace pressure in the soaking zone 3, particularly, a lower region thereof is lowered to less than an aimed value and, in addition, to a case where the exhaust gas temperature exceeds the heat resistant temperature of the recuperator 7a. It has a feature of controlling the furnace pressure in the lower region of the soaking zone 3 to a positive pressure by supplying the dilution air 8 by a predetermined flow rate.

That is, as shown in FIG. 8, a measured furnace pressure value P.1 by a furnace pressure gage 3b disposed in the lower region of a soaking zone 3 and an aimed furnace pressure (positive pressure) are compared in a processor 9a. Based on the result, the processor 9a at first sets the opening degree for the damper 7b for furnace pressure control to conduct furnace pressure control.

In the usual operation described above, a processor 9b compares a measured temperature value T.1 by a thermometer 7c disposed on the inlet of the recuperator 7a in the stack 7 and an aimed temperature of the exhaust gas at that position, that is, the upper limit for the heat resistant temperature of the recuperator 7a. When the measured temperature value T.1 approaches the upper limit for heat resistant temperature of the recuperator 7a, appropriate number of blower rotation and opening degree of a flow rate control value are given, respectively, to a blower 8a for supplying dilution air 8 and a flow rate control value 8b by an instruction from the processor 9b.

The temperature of the exhaust gas introduced to the recuperator 7a is decreased to an allowable range by supplying a predetermined flow rate of dilution air 8 to the stack 7 and mixing a dilution air 8 with the exhaust gas. The number of blower rotation and the opening degree of the flow rate control valve are fixed at the instance the measured temperature value T.1 is equal with the aimed temperature.

On the other hand, in the usual operation described above, when the combustion load on the burners is decreased and the measured furnace pressure value P.1 by the furnace pressure gage 3b changes from the aimed furnace pressure to a negative region, appropriate number of blower rotation and opening degree of the flow rate control value are given from the processor 9a to the blower 8a and the flow rate control value 8b respectively to supply a predetermined flow rate of dilution air 8 to the stack 7 and increase the furnace pressure. That is, when the dilution air 8 is supplied to the stack 7, since the flow rate of gas passing the stack 7 increases, the pressure loss in the stack 7 increases to rise the furnace pressure. As a result, furnace pressure in the lower region of the soaking zone 3 is prevented from going to a negative pressure. When the measured furnace pressure value P.1 is equal with the aimed furnace pressure, the number of flower rotation and the opening degree of the flow rate control value are fixed.

Figure 9:
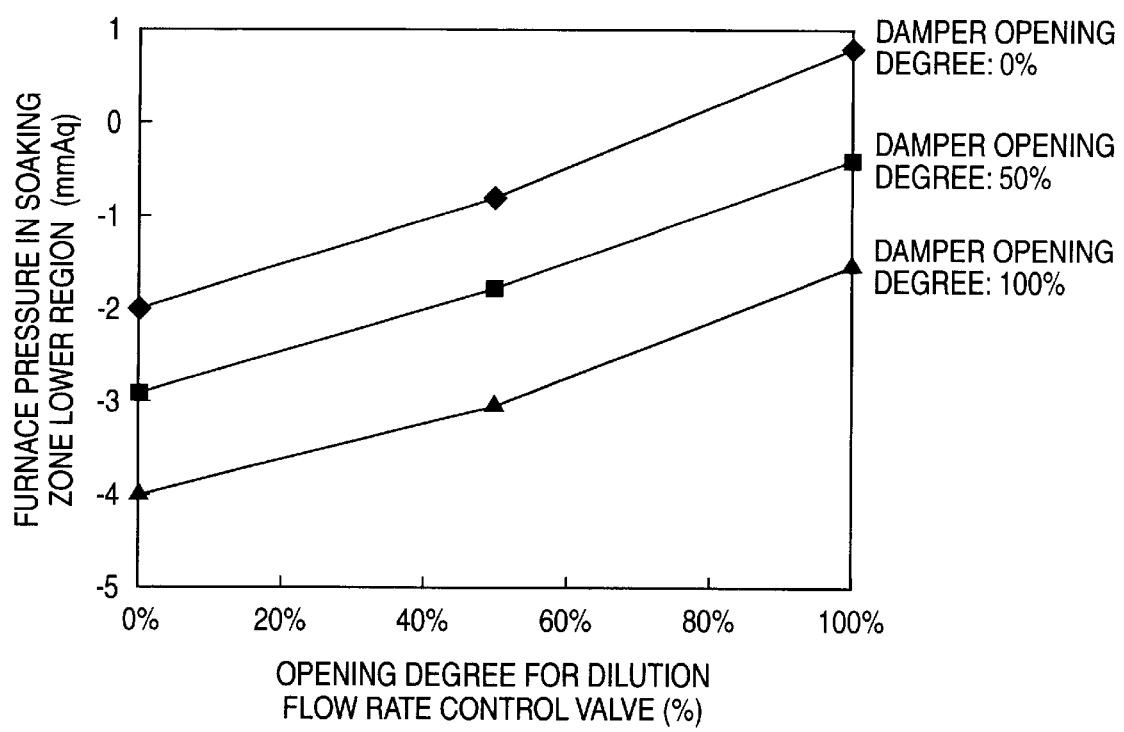
FIG. 9 is a view showing a relation between the opening degree of a flow rate control valve for dilution air and a furnace pressure.

FIG. 9 shows a relation between the opening degree of the flow rate control value for the dilution air 8 and the furnace pressure in the lower region of the soaking zone 3. The control range for the furnace pressure is extended greatly by the flow rate control for the dilution air 8. Even when the combustion load on the burners is small, the furnace pressure in the lower region of the soaking zone 3 can be made easily to a positive pressure by the supply of the dilution air 8. In addition, since existent facilities are utilized, there is no requirement for additional installation investment.

Figure 1:
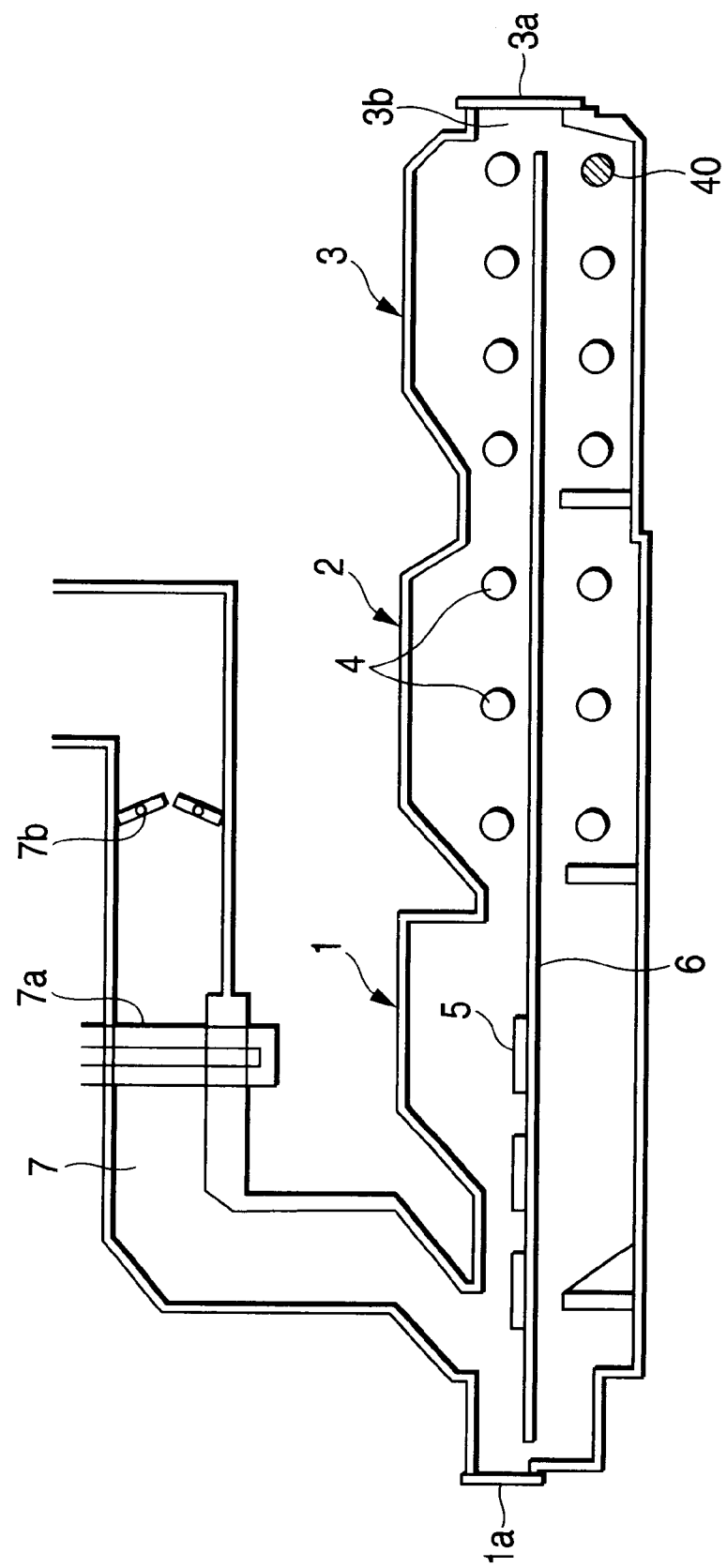
FIG. 1 is a view showing a structure of a continuous heating furnace.
Figure 3:
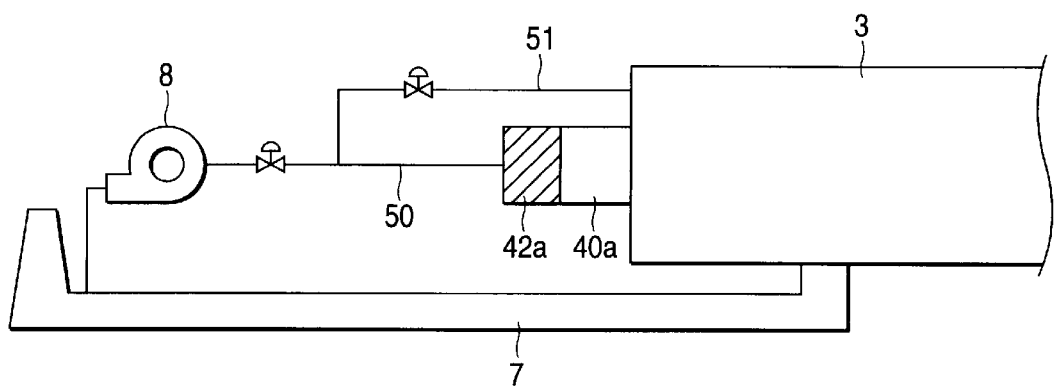
FIG. 3 is a view showing a discharge path of an exhaust gas in an existent heating furnace.

In the continuous heating furnace shown in FIG. 1, an independent control system is introduced to a heating burner 40 disposed in the lower region of the furnace extraction end, among plural heating burners 4 located in the furnace, which is different from the control system for other heating burners 4 to control combustion of the heating burner 40 independently.

Figure 13:
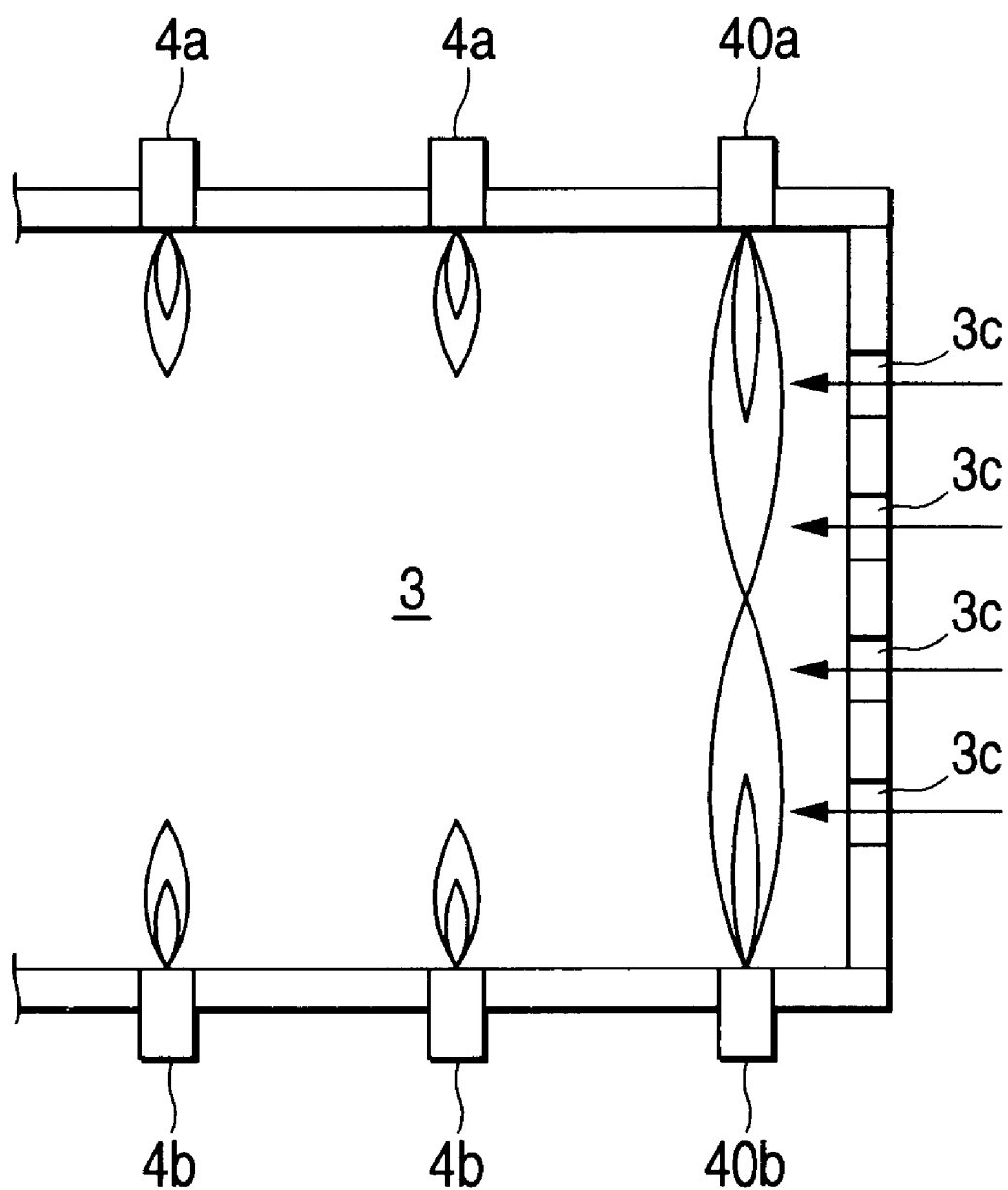
FIG. 13 is a view showing arrangement of heating burners in a furnace.

In this case, the heating burners 4 in the heating furnace are usually located such that paired burners 4a and 4b are opposed to each other between both side walls of the heating furnace as shown in FIG. 13. Also for the heating burners 40 located in the lower region on the furnace extraction end, they are located as a pair of burners 40a and 40b.

When the extraction door 3a of the hearing furnace is opened for extracting materials to be heated that are heated in the heating furnace to the outside of the furnace, combustion of the heating burners 40a and 40b is controlled independently. As shown in FIG. 2A and FIG. 2B, during opening of the extraction door 3a, combustion operation is conducted such that burner flames of the heating burners 40a and 40b extend laterally for the opening width of the extraction port 3b. When the burner flames are formed for the width of the opening of the extraction port 3b, air intruding from the extraction port 3b into the furnace is at first shut by the burner flame and can not further intrude into the furnace. In addition, since oxygen in the intruding air is consumed by the burner flame, increase of the oxygen concentration in the furnace by intruding air can be prevented.

Figure 14:
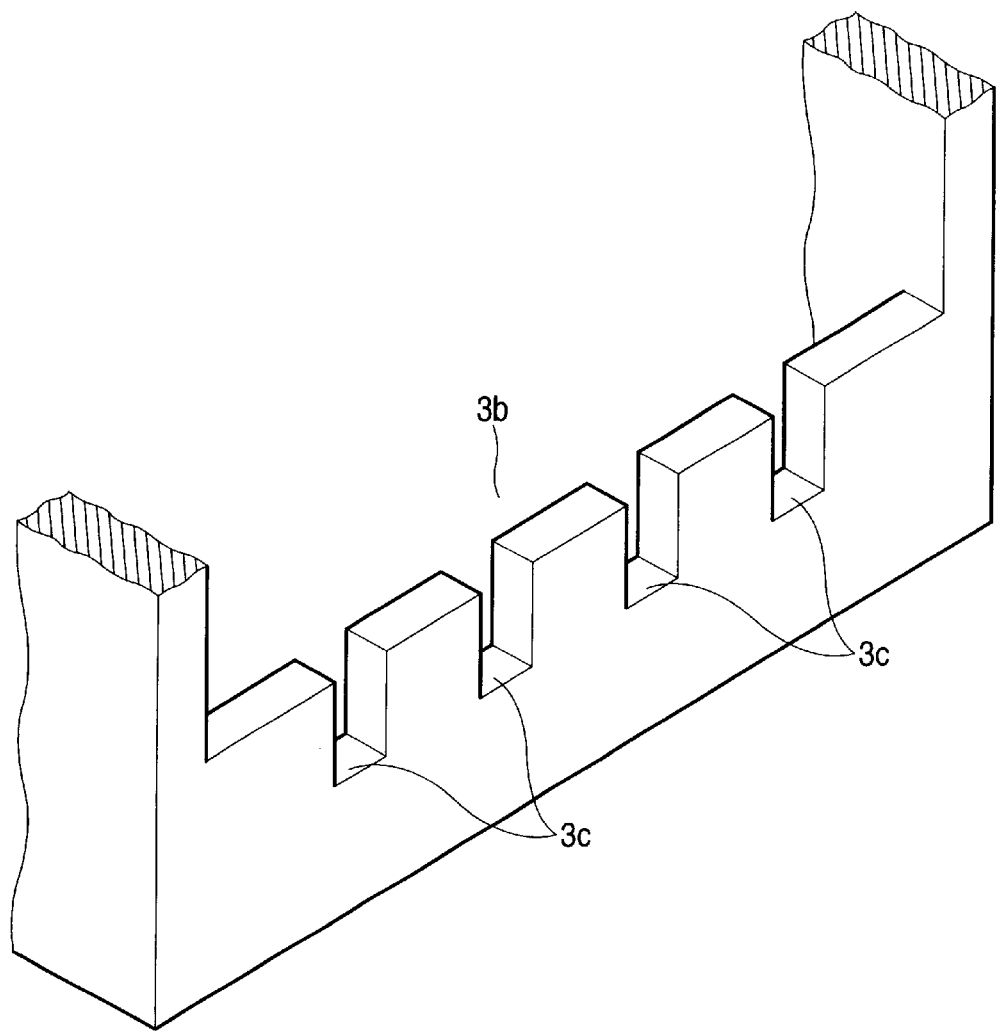
FIG. 14 is a view showing an extraction port of a heating furnace.

Particularly, as shown in FIG. 14, in an extraction door having a comb-shaped extraction fork opening 3c in the lower region of the extraction port 3b, since air tends to intrude through the extraction fork opening 3c, shutting for the air intrusion path by the burner flames of the heating burners 40a and 40b located in the lower region at the furnace extraction end is extremely effective. In a case where the heating burners are not arranged in pair, combustion control for extending the burner flame of a single heating burner in the lateral direction of the furnace may be conducted.

In this case, the position for forming the burner flames of the heating burners 40a and 40b is preferably within such a range that the burner flame is not in contact with structure in the lower region of the extraction port and as close as the extraction port in the longitudinal direction of the furnace. On the other hand, it is preferred that the burner flames are situated at a position capable of closing the extraction fork opening and is a range not in contact with the hearth in the height direction of the furnace.

Figure 15:
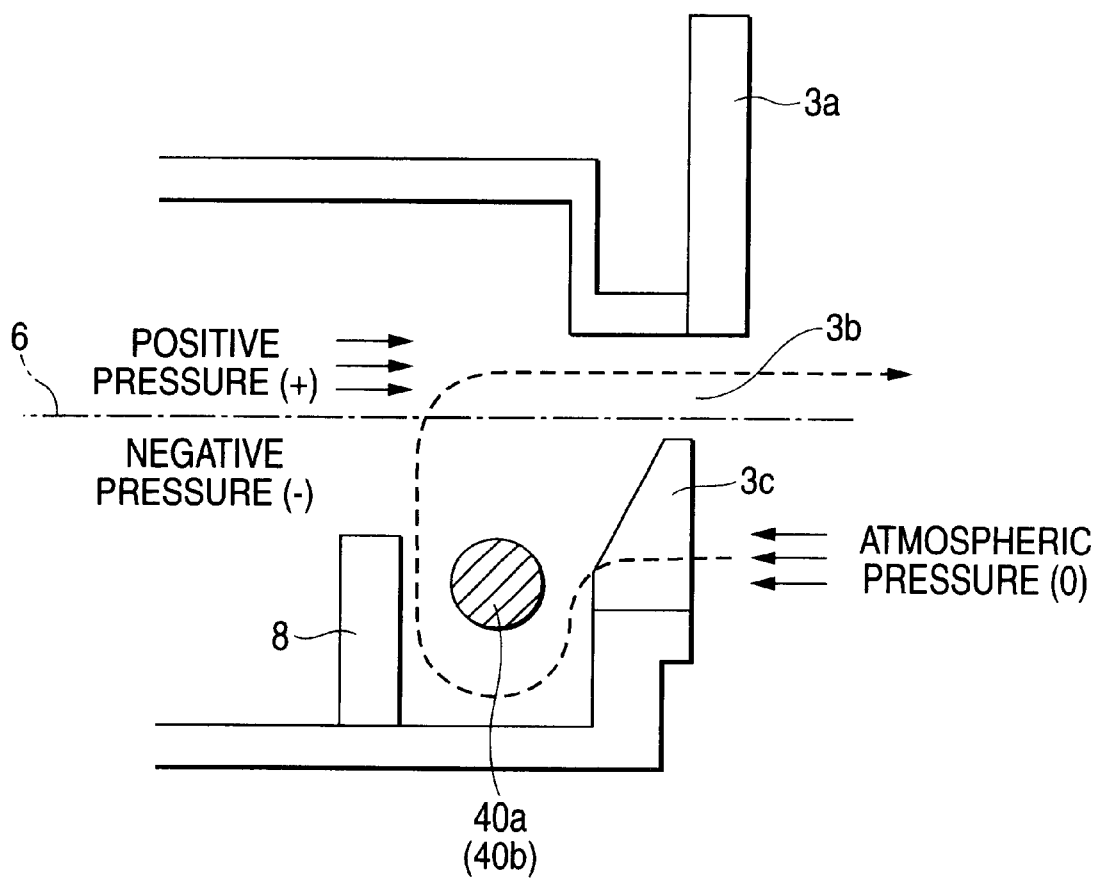
FIG. 15 is a view showing an air flow near the extraction end of a heating furnace.

As shown in FIG. 15, it is preferred to dispose a partition wall 8 standing vertically from the hearth in the inside of the furnace of the heating burners 40a and 40b and shut the air intruding path by the burner flames of the heating burners 40a and 40b.

As shown in FIG. 15, the pressure distribution in the furnace is at a positive pressure relative to the pressure outside of the furnace (substantially atmospheric pressure) in a portion above the transportation path 6 as the boundary is and it is at a negative pressure in the lower region. That is, since the draft is usually increased to the lower region in the furnace, the furnace pressure exhibits a distribution that is lowered toward the downward. In such a heating furnace, when the pressure in the entire region in the furnace is made positive, since the pressure in the upper portion of the furnace is higher, the gas in the furnace may possibly jet out from each of the openings. Therefore, the damper 7b (refer to FIG. 1) controls such that the furnace pressure is equal with the atmospheric pressure at the position for the height of the transportation path 6.

Air intruding from the extraction port 3b, particularly, the extraction fork opening 3c proceeds toward the lower region of the transportation path 6 and is mostly taken into the burner flames of the heating burners 40a and 40b. Since the temperature of the intruding air is lower than the temperature in the furnace, a portion of the intruding air enters in the direction once sinking to the hearth. Since the intruding air proceeds deeply from the back of the heating burners 40a and 40b into the furnace, it tends to intrude although lithe into the furnace.

When the partition wall 8 is provided, air intruding from the back of the heating burners 40a and 40b is blocked by the partition wall 8. Then, since it is warmed gradually and then flows as an ascending stream along the partition wall 8 and reaches a positive pressure region in the upper portion of the transportation path 6, it is discharged from the upper portion of the transportation path 6 to the outside of the furnace. In this way, also the air intruding from the back of the heating burners 40a and 40b can be prevented from intruding into the furnace.

Figure 16:
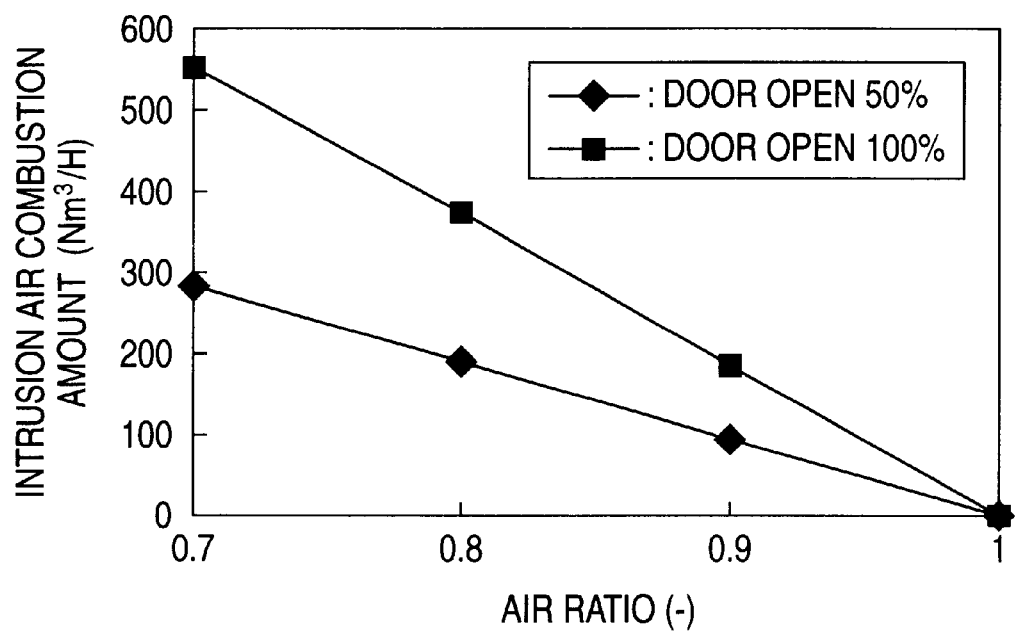
FIG. 16 is a view showing a relation between an air ratio of a heating burner and a combustion amount of intrusion air.

Further, when the air intruding path is shut by the burner flames of the heating burners 40a and 40b, it is preferred that the heating burners 40a and 40b are operated for combustion at a low air ratio. FIG. 16 shows a relation between the air ratio in the heating burner at the extraction end and the combustion amount of the intruding air by the heating burner. It is apparent that when the air ratio in the heating burner is lowered, the combustion amount of the intruding air in the heating burner is increased. When the heating burners 40a and 40b are operated for combustion under a low air ratio, oxygen in the air intruding from the extraction port 3b can be burnt and consumed directly, which is effective for keeping the low oxygen concentration in the furnace atmosphere. It is advantageous to make the height of the partition wall 8 larger for the width between both side walls of the furnace within a range not interfering transportation devices from the hearth to the inside of the furnace for shutting the intruding air and forming the ascending stream.

Figure 4:
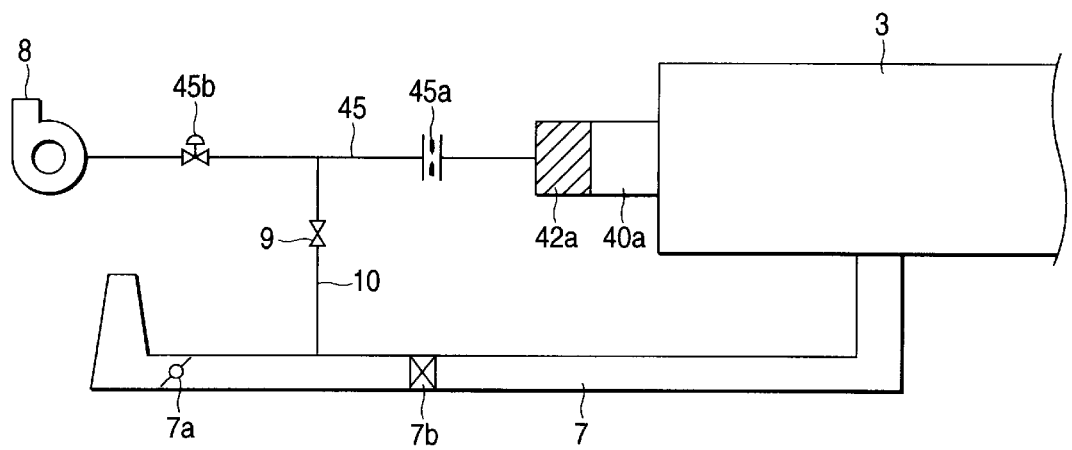
FIG. 4 is a view showing a discharge path of an exhaust gas in a heating furnace in accordance with this invention.

FIG. 4 shows a discharging path for an exhaust gas in a continuous heating furnace which is used directly for the method of this invention. A pipeline 10 is disposed between a path 45 from the burners 40a or 40b by way of the heat regeneration body 42a or 42b and the stack 7 shown in FIG. 2A and FIG. 2B to the suction device 8 shown in FIG. 4. It has a feature in providing the pipeline channel 10 between the inlet side of the suction device 8 and the stack 7 for introducing the exhaust gas in the heating furnace to the outside of the furnace for introducing the exhaust gas in the stack 7 by way of the on/off valve 9 to the suction device 8. A flow meter 45a is disposed in the channel 45, in the inlet side of the suction device 8 upstream to the junction portion for the pipeline channel 10 for measuring the suction amount of the exhaust gas from the burners and judging the on/off timing of the on/off valve 9. Further, a flow rate control value 45b is disposed between the junction portion for the pipeline channel 10 and the channel 45, and the suction device 8 for controlling the total flow rate to a predetermined amount.

In the heating furnace having the exhaust gas discharging path described above, in a case where the combustion load on the heat regenerating burners is decreased and the suction device 8 is operated at a load, for example, of less than 10%, the on/off valve 9 in the pipeline channel 10 is opened to introduce the exhaust gas in the stack 7 to the channel 45 on the inlet side of the suction device 8 to increase the operation load of the suction device 8.

Specifically, when the exhaust gas in the stack 7 is introduced to the path 45, the temperature of the exhaust gas after mixing the exhaust gas in the stack and the low temperature exhaust gas passing through the heat regeneration body is adapted not to exceed the upper limit of the suction device 8, particularly, the endurance temperature of the impeller. The pipe diameter for the pipeline channel 10 is selected to control the flow rate of the exhaust gas and, simultaneously, equalize the pressure loss between the exhaust gas in the stack and the low temperature exhaust gas passing the heat regeneration body at the mixing point and the mixed exhaust gas is introduced to the suction device 8.

This operation can easily attain increase of the operation load, for example, by 10% or more in the suction device 8 by which the problems described above for the extremely low load combustion can be overcome.

Then, supply of the exhaust gas in the stack by way of the pipeline channel 10 is terminated at the instance the suction amount from the burner exceeds the required minimum flow rate. That is, the on/off value in the pipeline channel 10 is closed. The required minimum flow rate means a lower limit for the stable operation region upon design of the blower.

The flow rate of the exhaust gas introduced to the suction device 8 can also be controlled by adapting the on/off valve 9 in the pipeline channel 10 as a flow rate control valve. However, operation for the flow rate control value is troublesome and, in addition, the mechanism thereof is complicated to also increase the installation cost. In this invention, a simple and convenient means for merely opening/closing a pipeline channel 10 of a predetermined pipe diameter is adopted.

In this case, the pipe diameter for the pipeline channel 10 can be designed, for example, in accordance with the following relations (A) and (B).

$$\text{(Exhaust gas dew point)} \leq Ta \leq Tb \quad \text{(A)}$$

$$\Delta P1 = \Delta P2 \quad \text{(B)}$$

in which

Ta: temperature of a mixed exhaust gas to provide V2=V1*V3

Tb: upper limit value for the duration temperature of the suction device (represented by bearing)

in which

V1: suction amount of exhaust gas at the lowest burner combustion (extremely low load).

V2: required minimum flow rate of exhaust gas for stable operation of a suction device.

V3: amount of exhaust gas for compensating difference: V2−V1.

ΔP1: pressure loss between the burner and the pipeline channel junction port in the channel 45.

ΔP2: pressure loss in the pipeline channel 10.

Further, as shown in FIG. 4, a recuperator 7a is disposed to the upstream of the pipeline channel 10 in the stack 7. It is preferred for extending the duration life of the suction device 8 to pass the exhaust gas in the furnace through the recuperator 7a and supply the exhaust gas lowered for the temperature to the pipeline channel 10.

In the embodiment described above, since the exhaust gas in the heating furnace is not mixed directly but the exhaust gas in the stack is mixed to the exhaust gas from the burners, it does not result in an external disturbance to the pressure in the hearth. The gas to be mixed with the exhaust gas from the burners is not restricted only to the exhaust gas in the stack but it may be a gas at a high temperature, that is, a hot blow. For example, it may be air heated to high temperature, or a combustion device may be disposed separately and the combustion exhaust gas generated therefrom may be mixed.

As shown in FIG. 2A, and FIG. 2B, the exhaust gas sucked from the burner 40a or 40b in the heat regenerating burners is introduced by way of the both-way channel 41a or 41b to the outside of the furnace. Suction of the exhaust gas is conducted through the path shown in FIG. 17. That is, both-way channels 41a and 41b extending from plural sets of heat regenerating burners are collected into exhaust gas ducts 8a and 8b disposed respectively, on every burner groups at one side and the other side of the furnace wall and, further, the exhaust gas ducts 8a and 8b are collected into a single conduit 9, and the conduit 9 is in communication by way of a suction blower 10 to the stack 7 of the heating furnace. Then, the exhaust gas is introduced to the stack 7 and discharged out of the furnace by the suction of the suction blower 10 by way of the both-way channel 41a and 41b, the exhaust gas ducts 8a and 8b and then by way of the conduit 9.

Figure 17:
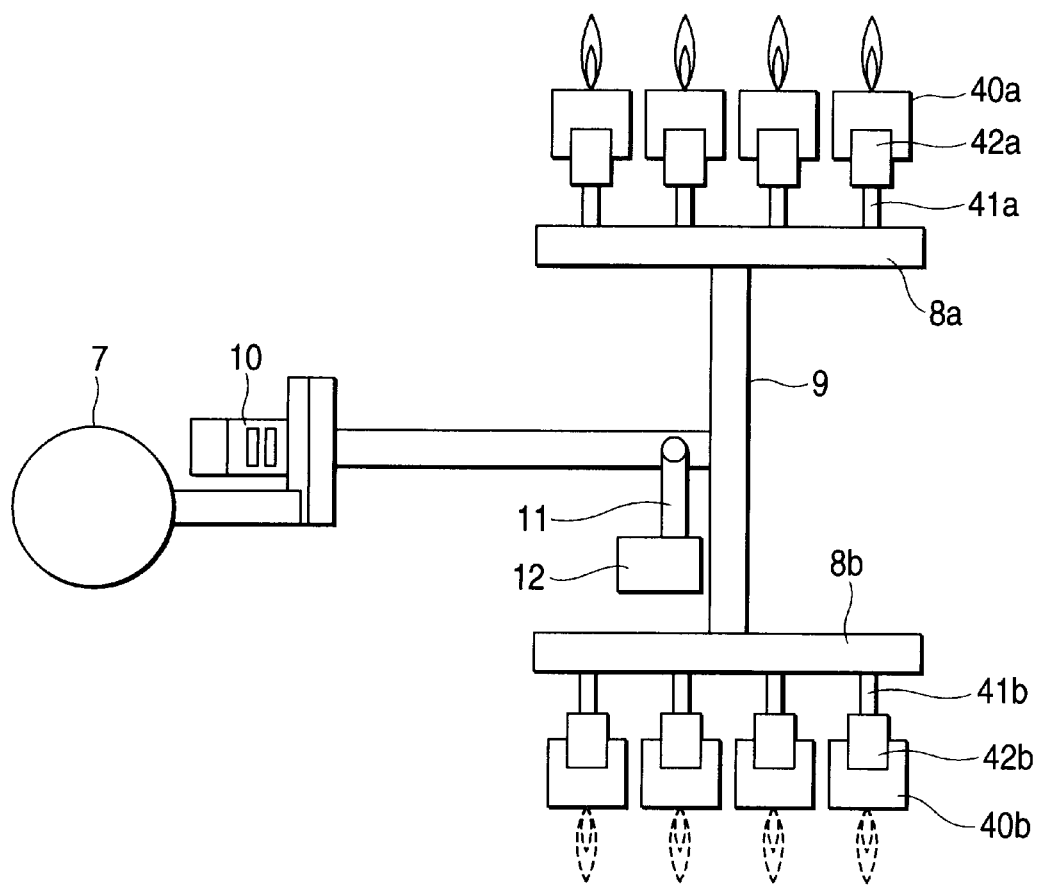
FIG. 17 is a view showing a discharging path of an exhaust gas from a heat regenerating burner.

For the exhaust gas discharging path described above, a probe 11 is inserted in the midway of the conduit 9 in the embodiment shown in FIG. 17. A portion of the exhaust gas flowing in the conduit 9 is sampled from the probe 11, and the concentration for each of the ingredients is measured by using an analyzer 19 for the sampled exhaust gas. Various kinds of measured concentration values thus obtained distinctly show the distribution of the furnace atmosphere, particularly, in the lateral direction of the furnace. They can be used as typical values for the concentration of the ingredients at the position in the furnace, for example, in the soaking zone 3 where the heat regenerating burners are located.

Figure 18:
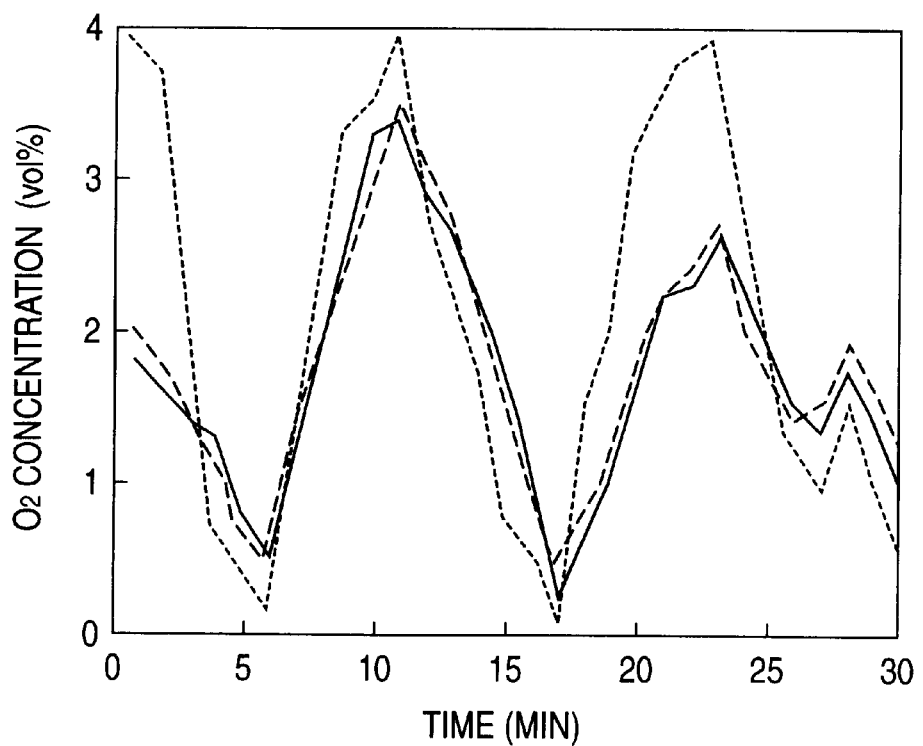
FIG. 18 is a view comparing measured values of an oxygen concentration in a furnace and an average oxygen concentration in a furnace by various methods.

Then, an error relative to the average oxygen concentration in the furnace was investigated for the case of sampling the exhaust gas sucked from the heat regenerating burners and measuring the oxygen concentration and for the case of measuring the oxygen concentration by way of the probe inserted through the furnace wall. The result is shown in FIG. 18. In the case where the exhaust gas sucked from the heat regenerating burners is sampled to measure the oxygen concentration, it can be seen that the difference with an actual average oxygen concentration in the furnace is extremely small. That is, the actual concentration for the ingredients in the furnace atmosphere can be measured by investigating the exhaust gas sucked from the heat regenerating burners. The average oxygen concentration in the furnace is a calculated value determined theoretically based on the flow rate of the gas charged in the burner, gas ingredient and the air ratio under the conditions where the extraction door and the charging door are closed, and under the condition of the furnace pressure set such that the intruding air in the furnace is at 0 Nm$^3$/h. Other conditions are to be described specifically in the subsequent examples.

Further, the position for sampling the exhaust gas sucked from the heat regenerating burners is preferably at the downstream of the heat regeneration body of the heat regenerating burners as shown in FIG. 17. The temperature of the exhaust gas recovered with heat by the heat regeneration body is naturally lower than the temperature of the furnace. When the probe is inserted at the downstream of the heat regeneration body, the probe is not exposed to the high temperature atmosphere and the duration life thereof can be extended.

In the embodiments described above, while descriptions have been made to a case of using the continuous heating furnace, this invention is applicable also to a batchwise heating furnace or rotational hearth type heating furnace.

EXAMPLE 1

A continuous heating furnace shown in FIG. 5 (height for transportation path from the furnace bottom: 0.5 m) was used, to which steel slabs each of 220 mm thickness, 1200 mm width and 9800 mm height were introduced and an operation for heating from room temperature to 1230° C. was conducted. The specification for four sets of heat regenerating burners located in the soaking zone of the heating furnace is as described below.
Remarks
Combustion capacity: 20000000 (kcal/H: burner)
Combustion switching timing between burner pair: 60 s/cycle
Exhaust gas suction ratio: 0.4–0.8 (–)

In the operation of the heating furnace described above, the suction ratio of the exhaust gas from the burners was adjusted variously in accordance with the amount of combustion load on for the entire heating furnace to control the furnace pressure as shown in Table 1. Further, as a comparison, an existent operation by setting the suction ratio of the exhaust gas constant was also conducted. As a result, the furnace pressure can be stably controlled under various conditions of combustion load in the actual operation of the heating furnace and, as shown in Table 2, the concentration of oxygen in the furnace could be decreased greatly and the fuel consumption ratio and the slab failure ratio could be decreased compared with the existent method.

Figure 7:
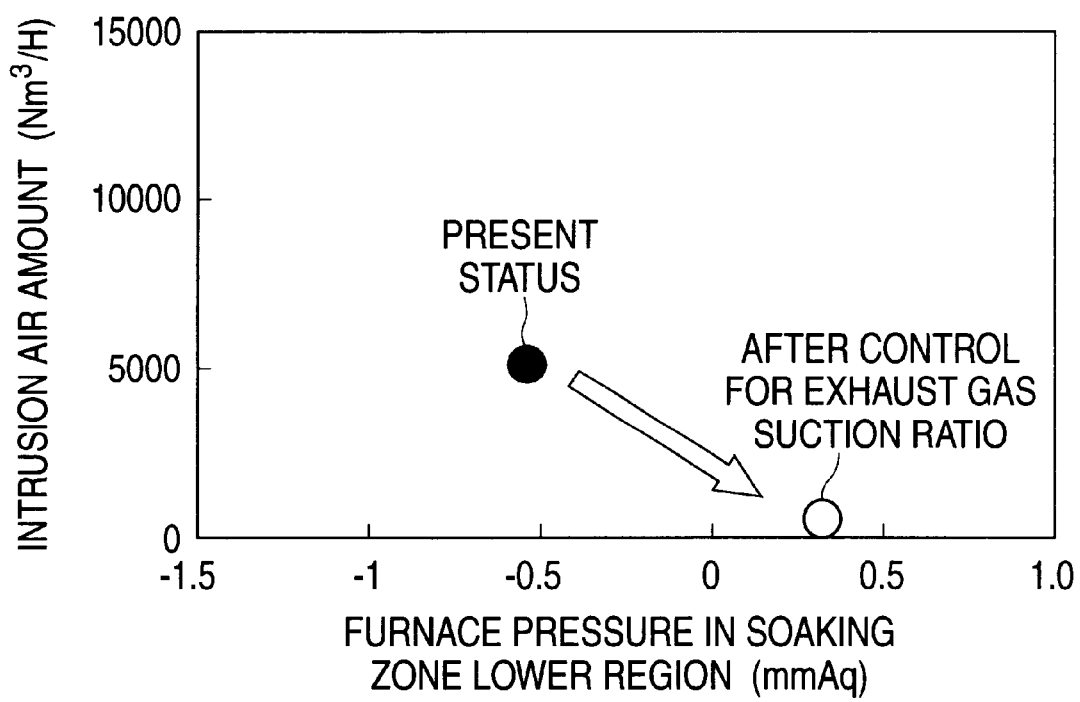
FIG. 7 is a view showing a relation between a furnace pressure and an amount of intrusion air.

Further, the relation between the furnace pressure and the amount of intruding air in the lower region of the soaking zone in the operation described above is averaged and arranged, and shown in FIG. 7.

EXAMPLE 2

A continuous heating furnace shown in FIG. 8 (height for transportation channel from the furnace bottom: 0.5 m) was used, to which steel slabs each of 220 mm thickness, 1200 mm width and 9800 mm height were introduced and an operation for heating from room temperature to 1230° C. was conducted.

The operation conditions are as described below.

Remarks
Heating furnace (burner) combustion load: 10–100%
Dilution air flow rate: 0–50,000 Nm$^3$/h
Exhaust gas temperature on the inlet of recuperator: 750° C. or lower
Damper opening degree in stack: 5–100%

In the operation for the heating furnace described above, in a case where the temperature of the exhaust gas on the inlet of the recuperator rises to 750° C. or higher, or the furnace pressure in the lower region of the soaking zone was decreased to 0 mmAq or less, dilution air was supplied under the condition that the temperature of the exhaust gas on the inlet of the recuperator of: ≦to 750° C., and furnace pressure in the soaking zone lower region of: >0 mmAq. Further, as a comparison, an operation with no control for furnace pressure by dilution air was also conducted.

Figure 10:
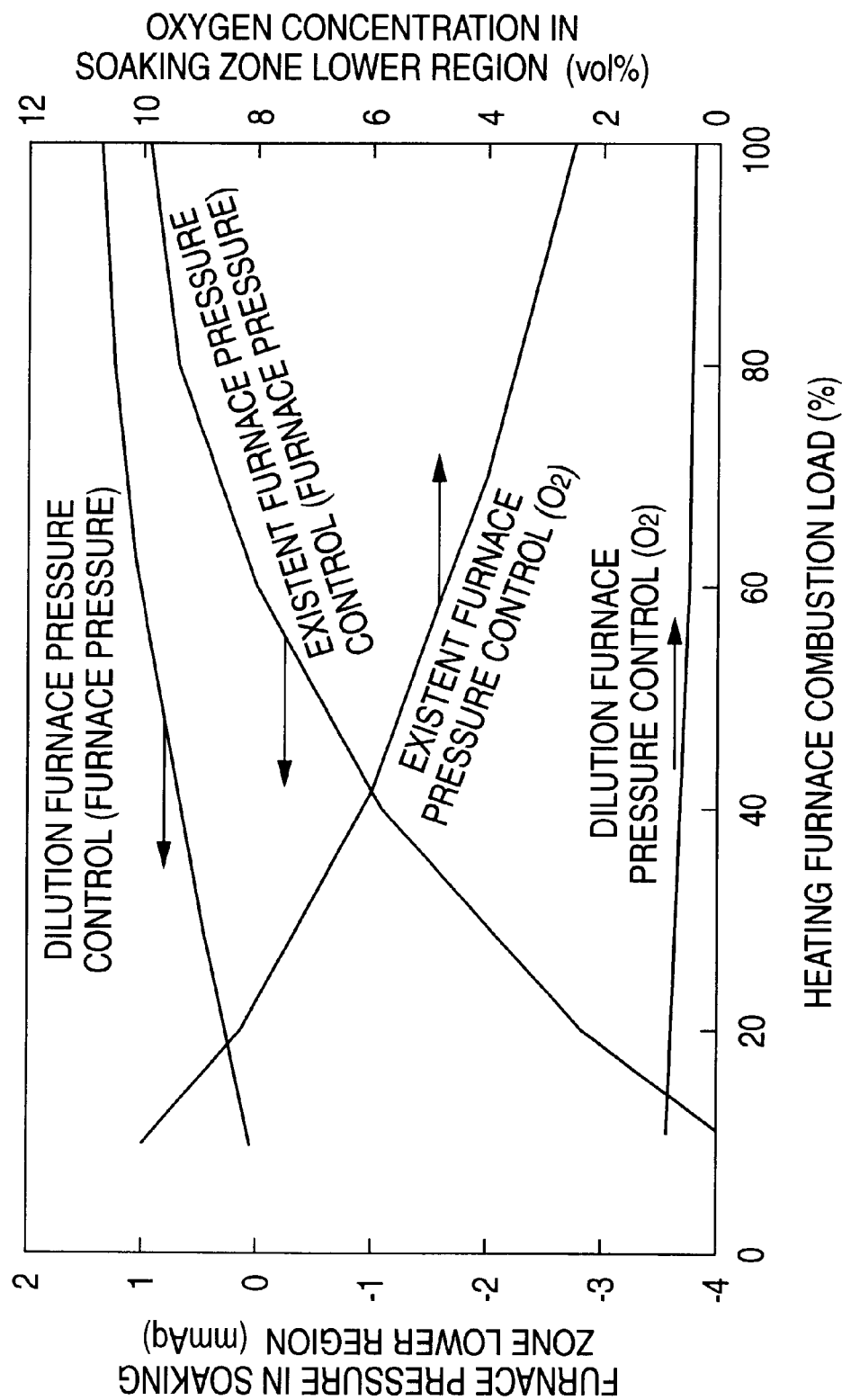
FIG. 10 is a view showing a relation between a furnace pressure control method, a furnace pressure and an oxygen concentration in a furnace.

In the operations described above, the furnace pressure in the lower region and the oxygen concentration in the lower region of the soaking zone were measured while the combustion load in the heating furnace is changed variously and the extraction door is in the close state. As shown by the result of measurement in FIG. 10, the pressure in the furnace could be maintained at a positive level and the oxygen concentration could be kept to a low level by controlling the furnace pressure by dilution air. On the contrary, in the existent furnace pressure control only by the damper, both the furnace pressure and the oxygen concentration varied greatly.

Then, in the similar operation, the furnace pressure and the oxygen concentration when the extraction door was closed/opened was measured in the same manner.

Figure 11:
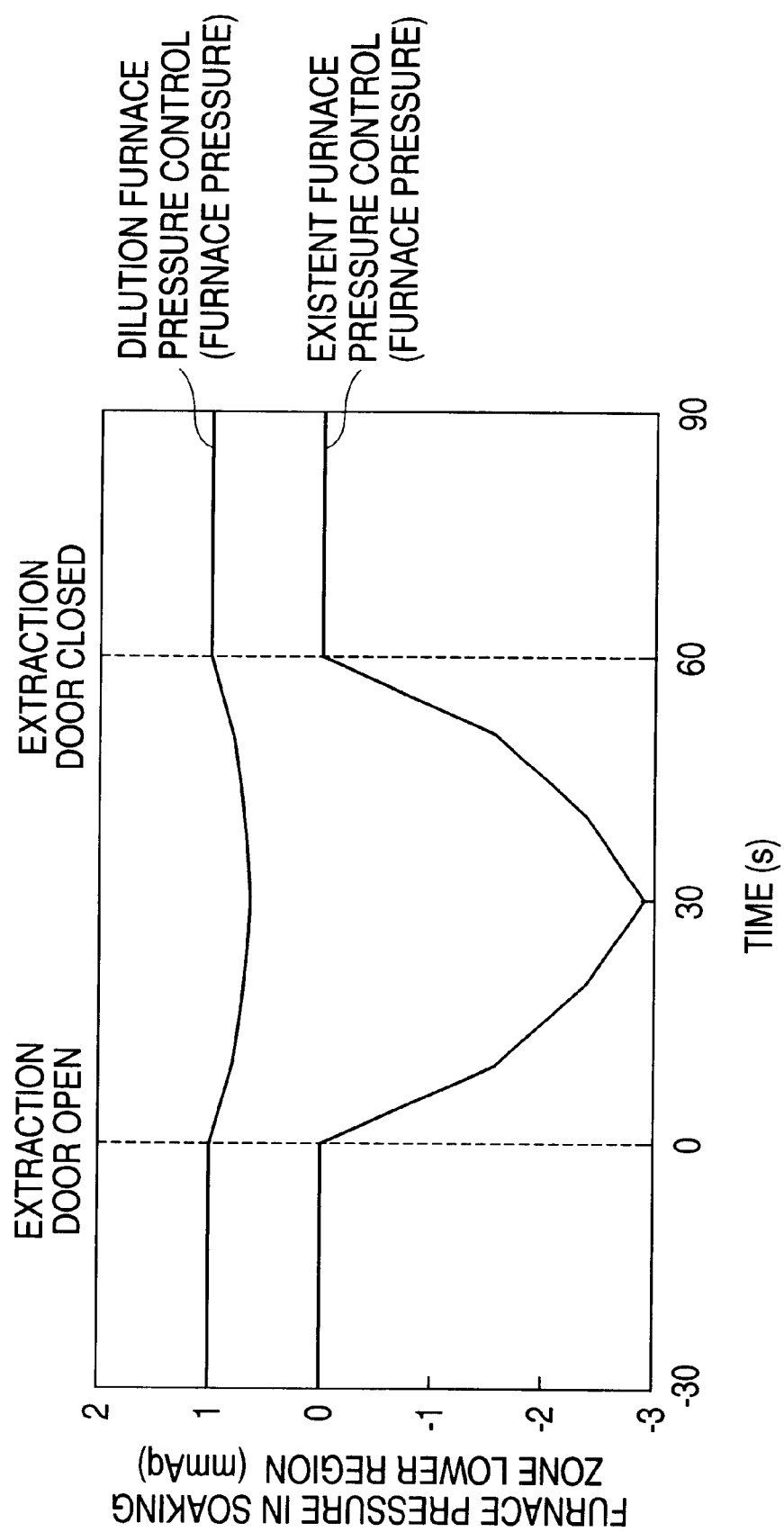
FIG. 11 is a view showing a relation between a furnace pressure control method and a furnace pressure.
Figure 12:
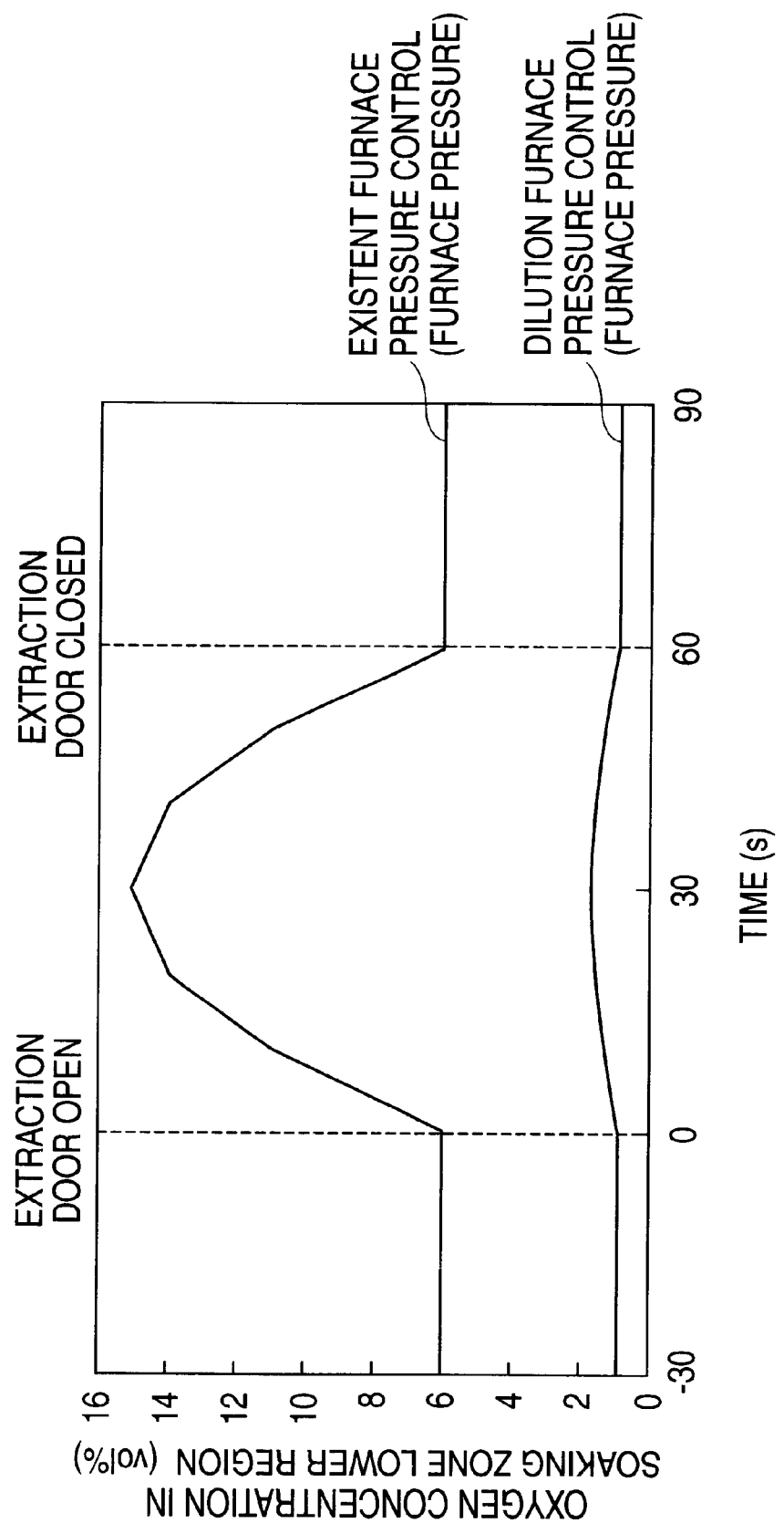
FIG. 12 is a view showing a relation between a furnace pressure control method and an oxygen concentration in furnace.

As shown in FIG. 11 and FIG. 12 for the result of measurement thereof, respectively, even when the extraction door was opened/closed, the pressure of the furnace can be kept positive and the oxygen concentration can also be kept at a low level by controlling the furnace pressure by dilution air.

EXAMPLE 3

In the continuous heating furnace shown in FIG. 1, an operation of heating the steel slabs from a room temperature to 1150° C. was conducted. Then, when the steel slabs after heating were extracted from the extraction door 3a, the heating burners 40a and 40b at the extraction end were operated for combustion under the conditions shown in Table 3. Further, in the operation of using the continuous heating furnace in which the partition wall 8 shown in FIG. 15 was located in the continuous heating furnace shown in FIG. 1 by the following specification, the steel slabs were extracted under the conditions shown in Table 3. Further, as a comparison, an existent operation for a heating furnace of operating the heating burners 40a and 40b at the extraction end under the same conditions as those for other heating burners 4 was also conducted.

The result for the measurement of the amount of air intruding in the heating furnace and the concentration of oxygen in the atmosphere in the soaking zone are also shown together in Table 3.
Remarks
Partition wall Height: 1.2 m from hearth
Width: identical with the furnace width

EXAMPLE 4

A continuous heating furnace shown in FIG. 1 (height for transportation channel from the furnace bottom: 0.5 m) was used, to which steel slabs each of 220 mm thickness, 1200 mm width and 9800 mm height were introduced and an operation for heating from room temperature to 1230° C. was conducted. The specification for four sets of heat regenerating burners located in the soaking zone of the heating furnace is as described below.

Remarks

Combustion capacity: 2,000,000 (kcal/H: burner)
Combustion load: 10–100%
Combustion switching timing between burner pair: 60 s/cycle
Suction ratio of exhaust gas; 60–90%

In the operation of the heating furnace described above, after passing the exhaust gas sucked from the heat regenerating burners through the heat regeneration body, a portion of the exhaust gas was sampled from the probe 11 inserted in the midway of the conduit 9 and the oxygen concentration was measured for the sampled exhaust gas by using the analyzer 12. The range for measuring the oxygen concentration in the furnace was 0 to 21 vol % and the atmosphere temperature in the pipe in the conduit 9 was 200° C. Further, as a comparison, the oxygen concentration was measured by way of a probe inserted from the furnace wall of the soaking zone.

The result of comparing the measured concentration values with the average oxygen concentration in the furnace is as shown in FIG. 18 and, in a case of measurement by the exhaust gas sucked from the heat regenerating burners in accordance with this invention, the error relative to the average oxygen concentration value in the furnace was less than 0.5%. On the contrary, in a case of measuring the oxygen concentration by way of the probe inserted from the furnace wall, the error relative to the average oxygen concentration value in the furnace was 1 to 3%.

Industrial Applicability

As has been described above, according to this invention, the furnace pressure can be controlled strictly. By the furnace pressure control, intrusion of air from the extraction door into the heating furnace can be prevented reliably. The deterioration of the quality of the material to be heated can be prevented. The fuel consumption in the heating furnace can be improved. According to this invention, operation of the suction device for the exhaust gas does not become unstable even when the combustion load on the heat regenerating burners is small. Since drains are not formed, the operation for the heating furnace is stabilized. According to this invention, the ingredient concentration in the atmosphere in the heating furnace can be measured exactly. Products of high quality can be produced by the control for the atmosphere in the furnace based on the measured values. Further, since the method of measuring the ingredient concentration for the atmosphere in the heating furnace according to this invention can be conducted by utilizing the existent facilities, no additional installation investment is necessary and it can be realized at a reduced cost.

TABLE 1

| | | Example of Invention | | Existent Example | |
|---|---|---|---|---|---|
| Operation | Combustion load on entire heating furnace (%) | Exhaust gas suction ratio (–) | Furnace pressure in lower region of soaking zone (mmAq) | Exhaust gas suction ratio (–) | Furnace pressure in lower region of soaking zone (mmAq) |
| 1 | 20 | 0.4 | 0 | 0.8 | −1.4 |
| 2 | 30 | 0.4 | 0 | 0.8 | −1.0 |
| 3 | 40 | 0.5 | 0 | 0.8 | −0.7 |
| 4 | 50 | 0.5 | 0.1 | 0.8 | −0.5 |
| 5 | 60 | 0.6 | 0.1 | 0.8 | −0.3 |
| 6 | 70 | 0.6 | 0.2 | 0.8 | −0.1 |
| 7 | 80 | 0.7 | 0.2 | 0.8 | 0 |
| 8 | 90 | 0.7 | 0.3 | 0.8 | 0.1 |
| 9 | 100 | 0.8 | 0.3 | 0.8 | 0.3 |

TABLE 2

| | Air intrusion amount in furnace (Nm$^3$/ | Oxygen concentration in furnace soaking zone (vol %) | Fuel consumption* unit (index) | Failure rate* (index) |
|---|---|---|---|---|
| Example of Invention | less than 500 | Less than 1 | 0.95 | less than 0.1 |
| Existent Example | About 50,000 | 5–10 | 1.0 | 1.0 |

*Indicated by index based on the result of existent example being assumed as 1 (result is better as the value is smaller)

TABLE 3

| | Combustion load (%) | | Air ratio | | | Air intrusion | Oxygen | |
|---|---|---|---|---|---|---|---|---|
| Operation | Extraction end burner | Other burner | Extraction end burner | Other burner | Partition wall | amount (Nm$^3$/H) | concentration (vol %) | Remarks |
| 1 | 100 | 80 | 0.8 | 1.05 | None | 500 | ≦1.0 | Example of the Invention |
| 2 | 100 | 50 | 0.8 | 1.05 | None | 600 | ≦1.5 | Example of the Invention |

TABLE 3-continued

| | Combustion load (%) | | Air ratio | | | Air intrusion | Oxygen | |
| --- | --- | --- | --- | --- | --- | --- | --- | --- |
| Operation | Extraction end burner | Other burner | Extraction end burner | Other burner | Partition wall | amount (Nm³/H) | concentration (vol %) | Remarks |
| 3 | 100 | 50 | 0.8 | 1.05 | Present | 300 | ≦1.0 | Example of the Invention |
| 4 | 60 | | 1.0 | | None | 5,000 | 5–10 | Existent Example |

What is claimed is:

1. A method of controlling a furnace pressure by utilizing heat regenerating burners in a heating furnace having a preheating zone, a heating zone and a soaking zone, in which plural sets of heat regenerating burners each having a pair of burners each having a heat regeneration body and opposed to each other are disposed as a heat source for the soaking zone, wherein the method comprises alternately burning the burners of each pairs of the heat regenerating burners, sucking an exhaust gas in the furnace form the burners during not combustion state, introducing the exhaust gas to the heat regeneration body thereby recovering the heat in the exhaust gas to the heat regeneration body, and utilizing the recovered heat for the heating of combustion air of the burners upon combustion state, thereby conducting operation for the heating furnace, wherein the suction ratio of the exhaust gas from the burner to the heat regeneration body is controlled in accordance with the combustion load on the entire heating furnace to control the furnace pressure in the soaking zone.

2. A method of controlling a furnace pressure in a heating furnace in which a recuperator is located in the midway of a stack for introducing an exhaust gas in the heating furnace to the outside of the furnace and combustion air supplied to burners as a heat source for the heating furnace is preheated by the recuperator, and dilution air is supplied to stack at a inlet of the recuperator for protecting the recuperator against high temperature atmosphere, wherein the flow rate of the dilution air is controlled in accordance with the temperature of the exhaust gas on the inlet of the recuperator and combustion load on the heating furnace, thereby controlling the furnace pressure.

3. A method of controlling an atmosphere in a heating furnace, comprising independently controlling combustion of heating burners located in a lower region of a furnace extraction end among plural heating burners located in the heating furnace upon opening the extraction door of heating furnace, extending the flame of the burners for the width of the opening in the lateral direction of extraction port, and shutting the intruding path of air from the extraction port with the burner flame, thereby suppressing increase of the oxygen concentration in the furnace.

4. A method of controlling an atmosphere in the heating furnace as defined in claim 3, wherein a partition wall standing vertically from the hearth is disposed to the heating burner located at the extraction end of the furnace on the inner side of the furnace thereby forming an ascending stream along with the partition wall, and carrying air intruding from the extraction port on the ascending stream.

5. A method of controlling an atmosphere in the heating furnace as defined in claim 4, wherein combustion operation is conducted under a low air ratio of the heating burners disposed at the extraction end of the furnace.

6. A method of controlling an atmosphere in the heating furnace as defined in claim 3, wherein combustion operation is conducted under a low air ratio of the heating burners disposed at the extraction end of the furnace.

7. An operation method for a heating furnace having a heat regenerating burner in which a pair of burners each attached with a heat regeneration body and opposed to each other are disposed as a heat source, the method comprising alternately burning each pair of burners in the heat regenerating burner, sucking an exhaust gas in the furnace from the burners during not combustion state, introducing the exhaust gas to the heat regeneration body thereby recovering heat in the exhaust gas to the heat regeneration body, and utilizing the recovered heat for heating the combustion air of the burners during combustion state, thereby conducting operation for the heating furnace, wherein a hot blow is supplied to a suction device for sucking the exhaust gas in the furnace from the burner in the not-combustion state through the heat regeneration body in a case where the combustion load on the heat regenerating burner is small.

8. An operation method for a heating furnace as defined in claim 7, wherein the hot blow is the exhaust gas in the stack for introducing the exhaust gas in the heating furnace to the outside of the furnace.

9. A method of measuring the concentration of an atmosphere gas in a heating furnace comprising heat regenerating burners in which a pair of burners each attached with a heat regeneration body are opposed to each other as a heat source, by alternately burning each pair of burners of the heat regenerating burner, sucking an exhaust gas in the furnace from the burners during not-combustion state, introducing the exhaust gas to the heat regeneration body thereby recovering the heat in the exhaust gas to the heat regeneration body, and utilizing the recovered heat for heating the combustion air of the burners during combustion state, thereby conducting operation for the heating furnace wherein a portion of the exhaust gas sucked from the burners is introduced into an analyzer and measuring the concentration of ingredients in the exhaust gas.

10. A method of measuring the concentration of the atmosphere gas in the heating furnace as defined in claim 9, wherein the measured value for the ingredient concentration of the exhaust gas sucked from the heat regenerating burners is used as a typical value for the ingredient concentrations in the zone of the heating furnace in which the heat regenerating burners are disposed.

11. A heating furnace having plural heat regenerating burners in which a pair of burners each attached with a heat regeneration body are opposed to each other as a heat source, and adapted for alternately burning each pair of burners in the heat regenerating burners, sucking an exhaust gas in the furnace from the burners during not combustion state, introducing the exhaust gas to the heat regeneration body thereby recovering heat in the exhaust gas to the heat regeneration body, utilizing the recovered heat for heating the combustion air of the burners during combustion state thereby conducting operation, wherein at least the heat regenerating burners located in the lower region at the extraction end of the heating furnace have a combustion control system independent of other heat regenerating burners.

12. A heating furnace as defined in claim 11, wherein a partition wall standing from the hearth is located at a position for putting the heat regenerating burner having an independent combustion control system relative to the extraction door of the heating furnace.

13. A heating furnace having heat regenerating burners in which a pair of burners each attached with a heat regeneration body are opposed to each other as a heat source, and adapted for alternately burning each pair of burners in the heat regenerating burners, sucking an exhaust gas in the furnace from the burners during not combustion state, introducing the exhaust gas to the heat regeneration body thereby recovering heat in the exhaust gas to the heat regeneration body, utilizing the recovered heat for heating the combustion air of the burners during combustion state thereby conducting operation, a suction device is disposed at the end of the path for sucking the exhaust gas in the heating furnace from the burners during not-combustion state by way of the heat regeneration body, and a pipeline channel is disposed to the sucking path on the inlet side of the sucking device for introducing a hot blow by way of an ON/OFF valve to the suction device.

14. A heating furnace as defined in claim 13, wherein the pipeline channel is connected with a stack for introducing the exhaust gas in the heating furnace to the outside of the furnace and introducing the exhaust gas in the heating furnace as a hot blow.

15. A heating furnace as defined in claim 14, wherein a recuperator is disposed to the upstream of the pipeline channel in the stack.

16. A heating furnace as defined in claim 13, wherein a recuperator is disposed to the upstream of the pipeline channel in the stack.

17. A heating furnace having plural heat regenerating burners in which a pair of burners each attached with a heat regeneration body are opposed to each other as a heat source, and adapted for alternately burning each pair of burners in the heat regenerating burners, sucking an exhaust gas in the furnace from the burners during not combustion state, introducing the exhaust gas to the heat regeneration body thereby recovering heat in the exhaust gas to the heat regeneration body and utilizing the recovered heat for heating the combustion air of the burners during combustion state thereby conducting operation, wherein a probe for sampling a portion of the exhaust gas and an analyzer for measuring the concentration of ingredients of the sampled exhaust gas are disposed in the midway of the path for discharging the exhaust gas in the heating furnace from the burner during not-combustion state by way of the heat regeneration body.

* * * * *